(12) United States Patent
Burkett

(10) Patent No.: US 11,274,603 B1
(45) Date of Patent: Mar. 15, 2022

(54) ELECTRIC HEATING SYSTEMS AND METHODS FOR GAS TURBINE ENGINES AND JET ENGINES

(71) Applicant: Bob Burkett, Carrollton, TX (US)

(72) Inventor: Bob Burkett, Carrollton, TX (US)

( * ) Notice: Subject to any disclaimer, the term of this patent is extended or adjusted under 35 U.S.C. 154(b) by 0 days.

(21) Appl. No.: 16/999,662

(22) Filed: Aug. 21, 2020

(51) Int. Cl.
| | |
|---|---|
| *F02C 7/224* | (2006.01) |
| *F02C 7/08* | (2006.01) |
| *F02K 3/10* | (2006.01) |
| *H02K 7/20* | (2006.01) |
| *H02K 7/18* | (2006.01) |
| *F02C 6/18* | (2006.01) |
| *F02C 6/04* | (2006.01) |

(52) U.S. Cl.
CPC ............... *F02C 7/224* (2013.01); *F02C 7/08* (2013.01); *F02K 3/10* (2013.01); *H02K 7/1823* (2013.01); *H02K 7/20* (2013.01); *F02C 6/04* (2013.01); *F02C 6/18* (2013.01); *F05D 2220/31* (2013.01); *F05D 2220/32* (2013.01); *F05D 2220/60* (2013.01); *F05D 2220/72* (2013.01); *F05D 2220/76* (2013.01)

(58) Field of Classification Search
CPC ......... F02C 7/224; F02C 7/08; H02K 7/1823; H02K 7/20; F02K 3/10; F05D 2220/60; F05D 2220/31; F05D 2220/72; F05D 2220/76; F05D 2220/32
USPC ........................................ 290/52; 123/179.21
See application file for complete search history.

(56) References Cited

U.S. PATENT DOCUMENTS

| | | | | |
|---|---|---|---|---|
| 2,174,266 | A * | 9/1939 | Jackson | F23R 3/14 60/39.828 |
| 4,196,773 | A * | 4/1980 | Trumpler | B64D 13/08 165/62 |
| 4,372,256 | A * | 2/1983 | Firey | F02B 71/00 123/23 |
| 4,912,931 | A * | 4/1990 | Joshi | F23C 6/045 60/732 |
| 5,002,024 | A * | 3/1991 | Firey | F02N 19/06 123/179.21 |
| 5,085,183 | A * | 2/1992 | Firey | F02N 19/06 123/179.21 |
| 5,159,899 | A * | 11/1992 | Dobrzynski | F02B 43/08 123/3 |
| 5,389,117 | A * | 2/1995 | Firey | C10J 3/20 110/229 |
| 5,828,797 | A * | 10/1998 | Minott | F01D 21/003 385/12 |
| 6,170,441 | B1 * | 1/2001 | Haldeman | F02M 25/0228 123/25 D |

(Continued)

*Primary Examiner* — Pedro J Cuevas

(57) ABSTRACT

Systems and methods for gas turbine or jet engines may include, among other things, one or more electric heating elements located within a combustion chamber of a gas turbine engine, a combustion chamber of a jet engine, or an afterburner of a jet engine. A combustion chamber and/or an afterburner may be configured to generate heated gas by using the one or more electric heating elements to heat gases within the combustion chamber and/or afterburner. A combustion chamber and/or an afterburner may be configured to generate an exhaust output based on the heated gas. The exhaust output may drive a turbine which generates electricity or mechanical energy. Thrust from the exhaust output from a jet engine may propel a vehicle.

14 Claims, 12 Drawing Sheets

(56) References Cited

U.S. PATENT DOCUMENTS

| | | | | |
|---|---|---|---|---|
| 7,234,306 | B2* | 6/2007 | Aumont | F23R 3/007 |
| | | | | 60/753 |
| 9,297,337 | B2* | 3/2016 | Janssen | F02M 43/00 |
| 11,022,051 | B2* | 6/2021 | Rigney | F02D 19/0689 |
| 2006/0032235 | A1* | 2/2006 | Aumont | F23R 3/60 |
| | | | | 60/796 |
| 2018/0266277 | A1* | 9/2018 | Aschenbruck | F01D 9/041 |
| 2018/0266691 | A1* | 9/2018 | Sweeney | F02C 3/06 |
| 2021/0087983 | A1* | 3/2021 | Rigney | F02B 47/02 |
| 2021/0254491 | A1* | 8/2021 | Del Campo | F01D 15/10 |
| 2021/0324792 | A1* | 10/2021 | Herold | F02C 7/06 |

\* cited by examiner

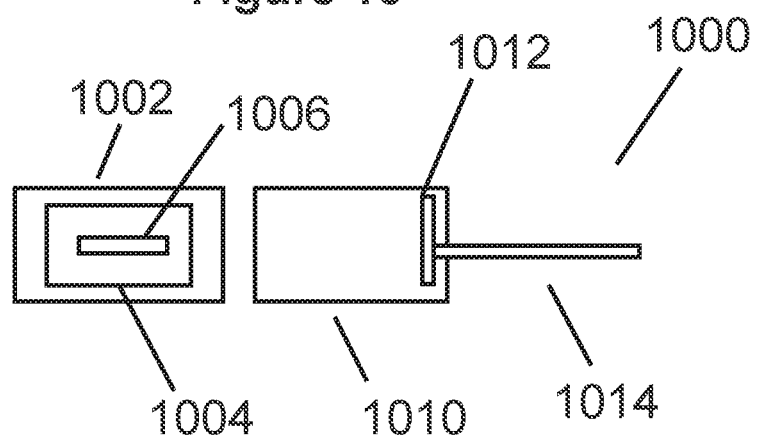

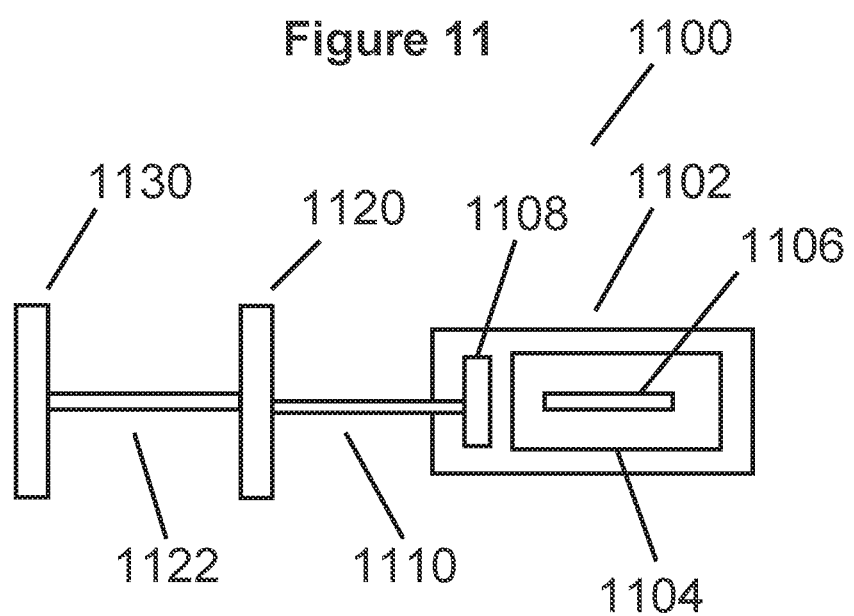

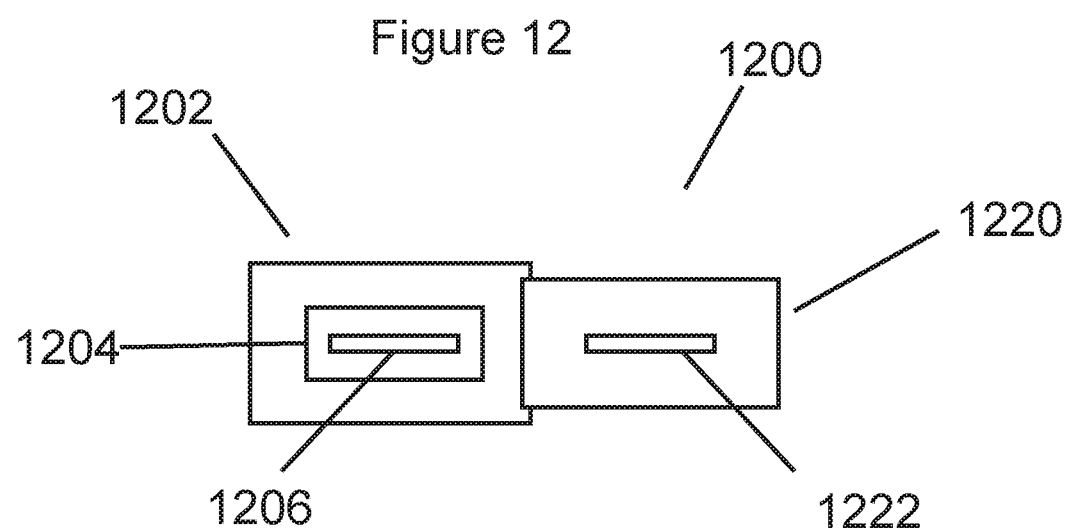

ELECTRIC HEATING SYSTEMS AND METHODS FOR GAS TURBINE ENGINES AND JET ENGINES

TECHNICAL FIELD

The present disclosure relates generally to electric heating systems and methods for gas turbine engines or jet engines. The systems and methods particularly relate to one or more electric heating elements within a combustion chamber of a gas turbine engine or within a combustion chamber and/or within an afterburner of a jet engine. The combustion chamber and/or the afterburner may be configured to use one or more electric heating elements to produce heated gas. The gas turbine engine or the jet engine may be further configured to use heated gas to generate electrical or mechanical power.

BACKGROUND

The generation of power is fundamental to modern society. Currently, electrical power is primarily generated by electromechanical generators driven by heat engines fueled by nuclear fission or fuel combustion. Most modes of transportation are powered by engines fueled by electricity or fuel combustion. However, a major source of global warming is the use of fossil fuels in the production of electricity and in powering modes of transportation.

The majority of power plants around the world utilize fossil fuel, nuclear fission and biomass to boil water thereby creating extreme heat, steam and pressure. Fossil fuel is expensive, unsustainable and contributes to global warming. Examples of the effects of global warming can be found in Australia with the bleaching of the Great Barrier Reef, the rising of sea water and the warming of the planet. Also, the warming of the earth has led to larger and stronger hurricanes in recent years.

Liquefied Natural Gas (LNG) is methane gas that can leak into the atmosphere prior to combustion with an effect worse than carbon dioxide. Methane is a particularly potent greenhouse gas and the fracking operations utilized to extract the natural gas with hydraulic fracturing can contaminate groundwater supplies. The use of heavy fuel oil to power cruise ships and cargo vessels is both less expensive and more damaging to the environment. This type of fuel for maritime shipping adds sulfur emissions in the atmosphere, resulting in acid rain. Automobiles, trucks, buses, trains, helicopters, propeller driven airplanes and jets all contribute to global warming.

BRIEF SUMMARY

Some aspects of the present disclosure provide an improved solution to the aforementioned problems. Particularly, one or more aspects of the present disclosure include less environmentally damaging gas turbine engine or jet engine systems and methods for producing electricity and/or powering modes of transportation. In certain embodiments, the presently disclosed gas turbine engine or jet engine systems and methods utilize electric heating elements within a combustion chamber of a gas turbine engine or within a combustion chamber and/or the afterburner of a jet engine to supplement or replace the heat traditionally generated by combustion of fuel. Accordingly, the presently disclosed systems and methods may operate more efficiently by producing greater amounts of electricity and power using standard levels of fuel. Alternatively, the presently disclosed systems and methods may generate standard amounts of electricity and power using lower levels of fuel or without fuel.

I. Systems of the Disclosure

Some aspects of the present disclosure are directed to electric systems for gas turbine engines or jet engines useful for generating electrical and/or mechanical power. Also disclosed are the following Embodiments 1 to 24 of the present disclosure.

Embodiment 1—A gas turbine engine, including: a combustion chamber housing including a housing wall defining a combustion chamber within the combustion chamber housing; one or more electric heating elements within the combustion chamber, wherein the one or more electric heating elements are configured to heat compressed air, a mixture of compressed air and fuel, combustion products of a mixture of compressed air and fuel, or a combination thereof, within the combustion chamber, to generate heated compressed air or heated combustion products, and wherein the combustion chamber housing is configured to generate an exhaust output based on the heated compressed air or the heated combustion products; one or more gas turbine blades in a flow path of the exhaust output generated by the combustion chamber housing, wherein the gas turbine blades are configured to spin based on the exhaust output generated by the combustion chamber housing; and a gas turbine shaft connected to the one or more gas turbine blades, wherein the gas turbine shaft is configured to rotate based on the spinning of the one or more gas turbine blades, and wherein the gas turbine shaft is configured to generate mechanical power through rotation.

Embodiment 2—The gas turbine engine system of Embodiment 1, wherein the one or more electric heating elements comprise molybdenum disilicide, silicon carbide, or a combination thereof.

Embodiment 3—The gas turbine engine system of Embodiment 1, further including an electric heating element controller coupled to the one or more heating elements, wherein the electric heating element controller is configured to adjust an amount of heat generated by the one or more electric heating elements.

Embodiment 4—The gas turbine engine system of Embodiment 1, further including: one or more power turbine blades in a flow path of the exhaust output generated by the combustion chamber housing, wherein the one or more power turbine blades are configured to spin based on the exhaust output generated by the combustion chamber housing; and a power turbine shaft connected to the one or more power turbine blades, wherein the power turbine shaft is configured to rotate based on the spinning of the one or more power turbine blades, and wherein the power turbine shaft is configured to generate mechanical power through rotation.

Embodiment 5—The gas turbine engine system of Embodiment 1, further including: a gearbox connected to the gas turbine shaft; a gearbox shaft connected to the gearbox, wherein the gearbox is configured to transfer the mechanical energy of rotation of the gas turbine shaft to the gearbox shaft, and wherein the gearbox is configured to control the rotation of the gearbox shaft; and one or more propeller blades connected to the gearbox shaft, wherein the one or more propeller blades are configured to spin based on the rotation of the gearbox shaft, and wherein the one or more propeller blades are configured to generate propulsion through spinning.

Embodiment 6—The gas turbine engine system of Embodiment 1, further including: an electric generator connected to the gas turbine shaft, wherein the electric generator is configured to convert the mechanical power of rotation of the gas turbine shaft into electricity; and an electric generator controller coupled to the electric generator, wherein the electric generator is configured to direct the electricity generated by the electric generator to the electric generator controller through one or more connectors.

Embodiment 7—The gas turbine engine system of Embodiment 6, further including: an electric motor coupled to the electric generator controller, wherein the electric generator controller is configured to direct the electricity received from the electric generator to the electric motor through one or more connectors, and wherein the electric motor is configured to convert the electricity received from the electric generator controller into torque; a motor shaft connected to the electric motor, wherein the electric motor is configured to apply the torque generated by the electric motor to the motor shaft; and wherein the motor shaft is configured to rotate based on the torque applied to the motor shaft; and one or more propeller blades connected to the motor shaft, wherein the one or more propeller blades are configured to spin based on the rotation of the motor shaft, and wherein the one or more propeller blades are configured to generate propulsion through rotation.

Embodiment 8—The gas turbine engine system of Embodiment 6, further including: a pod coupled to the electric generator controller, wherein the electric generator controller is configured to direct the electricity received from the electric generator to the pod through one or more connectors; an electric motor within the pod, wherein the pod is configured to direct the electricity received from the electric generator controller to the electric motor, and wherein the electric motor is configured to convert the electricity received from the pod into torque; a propeller shaft within the pod and connected to the electric motor, wherein the electric motor is configured to apply the torque generated by the electric motor to the propeller shaft, and wherein the propeller shaft is configured to rotate based on the torque applied to the propeller shaft; and one or more propeller blades within the pod and connected to the propeller shaft, wherein the one or more propeller blades are configured to spin based on the rotation of the propeller shaft, and wherein the one or more propeller blades are configured to generate propulsion through spinning.

Embodiment 9—The gas turbine engine system of Embodiment 6, further including: a heat recovery system coupled to the gas turbine engine, wherein the gas turbine engine is configured to direct the exhaust output generated by the combustion chamber housing to the heat recovery system through one or more connectors; and wherein the heat recovery system is configured to convert the heat of the exhaust output received from the gas turbine engine into steam; and a steam turbine engine coupled to the heat recovery system, wherein the heat recovery system is configured to direct the steam generated by the heat recovery system to the steam turbine engine through one or more connectors; and wherein the steam turbine engine includes: one or more steam turbine blades in a flow path of the steam generated by the heat recovery system, wherein the one or more steam turbine blades are configured to spin based on the steam generated by the heat recovery system; and a steam turbine shaft connected to the one or more steam turbine blades and to the electric generator, wherein the steam turbine shaft is configured to rotate based on the spinning of the one or more steam turbine blades, and wherein the steam turbine shaft is configured to generate mechanical power through rotation; wherein the electric generator is configured to convert the mechanical power of rotation of the steam turbine shaft into electricity.

Embodiment 10—The gas turbine engine system of Embodiment 9, further including: an electric motor coupled to the electric generator controller, wherein the electric generator controller is configured to direct the electricity received from the electric generator to the electric motor through one or more connectors, and wherein the electric motor is configured to convert the electricity received from the electric generator controller into torque; a motor shaft connected to the electric motor, wherein the electric motor is configured to apply the torque generated by the electric motor to the motor shaft, and wherein the motor shaft is configured to rotate based on the torque applied to the motor shaft; and one or more propeller blades connected to the motor shaft, wherein the one or more propeller blades are configured to spin based on the rotation of the motor shaft, and wherein the one or more propeller blades are configured to generate propulsion through spinning.

Embodiment 11—The gas turbine engine system of Embodiment 9, further including: a pod coupled to the electric generator controller, wherein the electric generator controller is configured to direct the electricity received from the electric generator to the pod through one or more connectors; an electric motor within the pod, wherein the pod is configured to direct the electricity received from the electric generator controller to the electric motor, and wherein the electric motor is configured to convert the electricity received from the pod into torque; a propeller shaft within the pod and connected to the electric motor, wherein the electric motor is configured to apply the torque generated by the electric motor to the propeller shaft, and wherein the propeller shaft is configured to rotate based on the torque applied to the propeller shaft; and one or more propeller blades within the pod and connected to the propeller shaft, wherein the one or more propeller blades are configured to spin based on the rotation of the propeller shaft, and wherein the one or more propeller blades are configured to generate propulsion through spinning.

Embodiment 12—The gas turbine engine system of Embodiment 6, further including: a heat recovery system coupled to the gas turbine engine, wherein the gas turbine engine is configured to direct the exhaust output generated by the combustion chamber housing to the heat recovery system through one or more connectors; and wherein the heat recovery system is configured to convert the heat of the exhaust output generated by the combustion chamber housing into steam; a steam turbine engine coupled to the heat recovery system, wherein the heat recovery system is configured to direct the steam generated by the heat recovery system to the steam turbine engine through one or more connectors, and wherein the steam turbine engine comprises: one or more steam turbine blades in a flow path of the steam generated by the heat recovery system, wherein the one or more steam turbine blades are configured to spin based on the steam generated by the heat recovery system; and; a steam turbine shaft connected to the one or more steam turbine blades, wherein the steam turbine shaft is configured to rotate based on the spinning of the one or more steam turbine blades; and wherein the steam turbine shaft is configured to generate mechanical power through rotation; a second electric generator connected to the steam turbine shaft, wherein the second electric generator is configured to convert the mechanical power of rotation of the steam turbine shaft into electricity; and a second electric generator controller coupled to the second electric generator, wherein the second electric generator is configured to direct the electricity generated by the second electric generator to the second electric generator controller through one or more connectors.

Embodiment 13—The gas turbine engine system of Embodiment 12, further comprising: a first electric motor coupled to the electric generator controller, wherein the electric generator controller is configured to direct the electricity received from the electric generator to the first electric motor through one or more connectors, wherein the first electric motor is configured to convert the electricity received from the electric generator controller into torque; a first motor shaft connected to the first electric motor, wherein the first electric motor is configured to apply the torque generated by the first electric motor to the first motor shaft, wherein the first motor shaft is configured to rotate based on the application of the torque applied to the first motor shaft; one or more first propeller blades connected to the first motor shaft, wherein the one or more first propeller blades are configured to rotate with the first motor shaft, and wherein the one or more first propeller blades are configured to generate propulsion through rotation; a second electric motor coupled to the second electric generator controller, wherein the second electric generator controller is configured to direct electricity received from the second electric generator to the second electric motor through one or more connectors, wherein the second electric motor is configured to convert the electricity received from the second electric generator controller into torque; a second motor shaft connected to the second electric motor, wherein the second electric motor is configured to apply the torque generated by the second electric motor to the second motor shaft, and wherein the second motor shaft is configured to rotate based on the torque applied to the second motor shaft; and one or more second propeller blades connected to the second motor shaft, wherein the one or more second propeller blades are configured to rotate with the second motor shaft, and wherein the one or more second propeller blades are configured to generate propulsion through rotation.

Embodiment 14—The gas turbine engine system of Embodiment 12, further including: a first pod coupled to the electric generator controller, wherein the electric generator controller is configured to direct the electricity received from the electric generator to the first pod through one or more connectors; a first electric motor within the first pod, wherein the first pod is configured to direct the electricity received from the electric generator controller to the first electric motor, and wherein the first electric motor is configured to convert the electricity received from the first pod into torque; a first propeller shaft within the first pod and connected to the first electric motor, wherein the first electric motor is configured to apply the torque generated by the first electric motor to the first propeller shaft, and wherein the first propeller shaft is configured to rotate based on the torque applied to the first propeller shaft; one or more first propeller blades within the first pod and connected to the first propeller shaft, wherein the one or more first propeller blades are configured to spin based on the rotation of the first propeller shaft, and wherein the one or more first propeller blades are configured to generate propulsion through spinning; a second pod coupled to the second electric generator controller, wherein the second electric generator controller is configured to direct the electricity received from the second electric generator to the second pod through one or more connectors; a second electric motor within the second pod, wherein the second pod is configured to direct the electricity received from the second electric generator controller to the second electric motor, and wherein the second electric motor is configured to convert the electricity received from the second pod into torque; a second propeller shaft within the second pod and connected to the second electric motor, wherein the second electric motor is configured to apply the torque generated by the second electric motor to the second propeller shaft, and wherein the second propeller shaft is configured to rotate based on the application of the torque applied to the second propeller shaft; and one or more second propeller blades within the second pod and connected to the second propeller shaft, wherein the one or more second propeller blades are configured to spin based on the rotation of second propeller shaft, and wherein the one or more second propeller blades are configured to generate propulsion through spinning.

Embodiment 15—A jet engine including: a combustion chamber housing including a housing wall, wherein the housing wall defines a combustion chamber within the combustion chamber housing; one or more electric heating elements within the combustion chamber, wherein the one or more electric heating elements are configured to heat compressed air, a mixture of compressed air and fuel, combustion products of a mixture of compressed air and fuel, or a combination thereof, within the combustion chamber, to generate heated combustion products, and wherein the combustion chamber housing is configured to generate an exhaust output based on the heated combustion products.

Embodiment 16—The jet engine system of Embodiment 15, wherein the one or more electric heating elements comprise molybdenum disilicide, silicon carbide, or a combination thereof.

Embodiment 17—The jet engine system of Embodiment 15, further including one or more auxiliary power units coupled to the one or more electric heating elements, wherein the one or more auxiliary power units are configured to supply electricity to the one or more electric heating elements.

Embodiment 18—The jet engine system of Embodiment 15, further including an electric heating element controller coupled to the one or more electric heating elements, wherein the electric heating element controller is configured to adjust an amount of heat generated by the one or more electric heating elements.

Embodiment 19—the jet engine system of Embodiment 15, further including: an afterburner coupled to the jet engine, wherein the jet engine is configured to direct the exhaust output generated by the jet engine to the afterburner; and one or more second electric heating elements within the afterburner, wherein the one or more second electric heating elements are configured to heat the exhaust output received from the jet engine, a mixture of the exhaust output received from the jet engine and fuel, afterburner combustion products of a mixture of the exhaust output received from the jet engine and fuel, or a combination thereof, within the afterburner, to generate heated exhaust output or heated afterburner combustion products, and wherein the afterburner is configured to generate an afterburner exhaust output based on the heated exhaust output or the heated afterburner combustion products.

Embodiment 20—The jet engine system of Embodiment 19, wherein the one or more electric heating elements, the one or more second electric heating elements, or a combination thereof, comprise molybdenum disilicide, silicon carbide, or a combination thereof.

Embodiment 21—The jet engine system of Embodiment 19, further including one or more auxiliary power units coupled to the one or more electric heating elements, the one or more second electric heating elements, or both, wherein the one or more auxiliary power units are configured to supply electricity to the one or more electric heating elements, the one or more second electric heating elements, or both.

Embodiment 22—The jet engine system of Embodiment 19, further including an electric heating element controller coupled to the one or more electric heating elements, the one or more second electric heating elements, or both, wherein the controller is configured to adjust an amount of heat generated by the one or more electric heating elements, the one or more second electric heating elements or both.

Embodiment 23—a jet engine system including: a jet engine; an afterburner coupled to the jet engine, wherein the jet engine is configured to direct an exhaust output generated by the jet engine to the afterburner; and one or more electric heating elements within the afterburner, wherein the one or more electric heating elements are configured to heat the exhaust output received from the jet engine, a mixture of the exhaust output received from the jet engine and fuel, afterburner combustion products of a mixture of the exhaust output received from the jet engine and fuel, or a combination thereof, within the afterburner, to generate heated exhaust output or heated afterburner combustion products, and wherein the afterburner is configured to generate an afterburner exhaust output based on the heated exhaust output or the heated afterburner combustion products.

Embodiment 24—The jet engine system of Embodiment 23, wherein the one or more electric heating elements comprise molybdenum disilicide, silicon carbide, or a combination thereof.

II. Methods of the Disclosure

It is contemplated that any Embodiment discussed in this specification can be implemented with respect to any system or method of the disclosure, and vice versa. Further, the systems of the disclosure can be used to achieve methods of the disclosure.

The foregoing has outlined rather broadly the features and technical advantages of the present disclosure in order that the detailed description that follows may be better understood. Additional features and advantages will be described hereinafter which form the subject of the claims herein. It should be appreciated by those skilled in the art that the conception and specific embodiments disclosed may be readily utilized as a basis for modifying or designing other structures for carrying out the same purposes of the present designs. It should also be realized by those skilled in the art that such equivalent constructions do not depart from the spirit and scope as set forth in the appended claims. The novel features which are believed to be characteristic of the designs disclosed herein, both as to the organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following descriptions taken in conjunction with the accompanying drawing, in which:

FIG. 10 illustrates a particular embodiment of the disclosure showing a Single Cycle gas turbine engine system 1000 configured to use power turbine 1010 to directly generate mechanical power by rotation of power shaft 1014.

FIG. 11 illustrates a particular embodiment of the disclosure showing a Single Cycle gas turbine engine system 1100 configured to use gas turbine engine 1102 to directly generate mechanical power through rotation of gas turbine shaft 1110.

FIG. 12 illustrates a particular embodiment of the disclosure showing a jet engine system 1200.

DETAILED DESCRIPTION

I. Definitions

Figure 1:
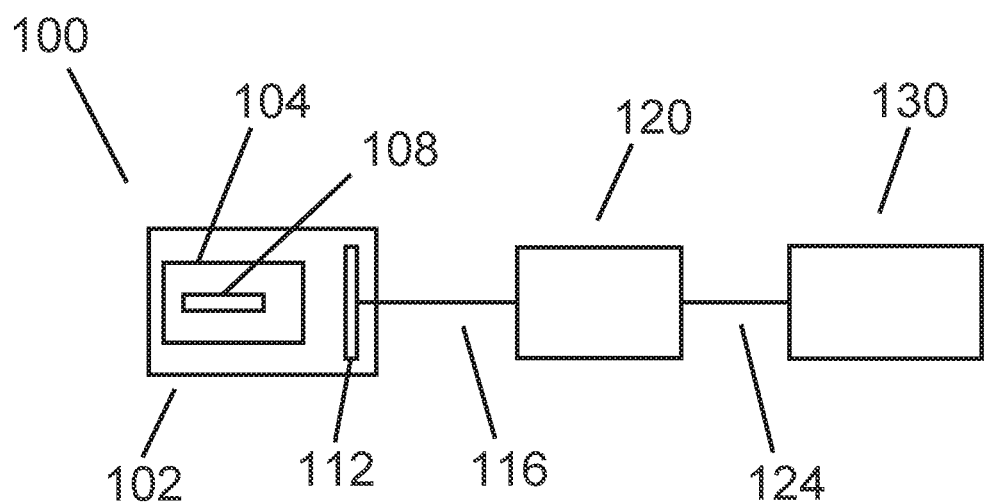
FIG. 1 illustrates a particular embodiment of the disclosure showing a Simple Cycle gas turbine engine system 100 configured to generate electricity in a single electric generator 120.

As used herein, the term "fuel" refers to any material that may be burned to produce heat. Examples of fuel include, but are not limited to, any kind of flammable coal, wood, gas, oil, and so forth. Particular examples include natural gas, petroleum products, biofuels, and so forth.

As used herein, the term "gas turbine engine" refers to a rotary mechanical device that is configured to extract heat energy from a fluid flow (compressed air or combustion products of a mixture of compressed air and fuel) and to convert it to useful mechanical work.

As used herein, the term "jet engine" refers to a gas turbine engine in which the heat energy of combustion products of a mixture of compressed air and fuel is converted into thrust which is used to propel a vehicle.

As used herein, the term "vehicle" refers to a machine that transports people or cargo by land, air, water, or space. Examples of vehicles include, but are not limited to, land vehicle such as cars and trucks, aircraft such as airplanes and helicopters, marine vessels such as ships, boats, and submarines, spacecraft such as rockets and shuttles, and so forth.

As used herein, the term "electric heating element" refers to a device capable of converting electrical energy into heat using techniques such as resistive heating (aka resistance, Joule or Ohmic heating) which passes an electric current through a conductive element which resists the current thus generating heat.

As used herein, the term "pod" refers to a housing connected to the outside of a vehicle which houses a propulsion system.

II. General Embodiments

Specific embodiments of the disclosure include systems and methods useful for generating enhanced and/or more efficient gas turbine engine power. Particular embodiments of the disclosure include a gas turbine engine including a combustion chamber housing which has: a housing wall which defines a combustion chamber; and one or more electric heating elements within the combustion chamber.

In specific embodiments, the electric heating elements may include any material which converts electricity to heat. In particular embodiments, the electric heating elements may operate by resistive heating techniques. In specific embodiments, the electric heating elements may include, but are not limited to, metal wire, ceramics, semiconductors, thick film heaters, positive temperature coefficient (PTC) ceramics and rubbers, metal-ceramic composites, ultra-high-temperature ceramics, and so forth. In particular embodiments, the electric heating elements may withstand temperatures of up to 1500° C. In particular embodiments, the electric heating elements may withstand temperatures of up to 2000° C. In particular embodiments, the electric heating elements may withstand temperatures greater than 2000° C.

In particular embodiments, the electric heating elements may include ultra-high-temperature ceramics. In particular embodiments, the electric heating elements include molybdenum disilicide ($MoSi_2$). In particular embodiments, the electric heating elements include silicon carbide.

In specific embodiments, the combustion chamber housing is configured to ignite a mixture of compressed air and fuel to form combustion products of the mixture of compressed air and fuel. In specific embodiments, the electric heating elements are configured to generate heated compressed air or heated combustion products by heating compressed air, a mixture of compressed air and fuel, and/or combustion products within the combustion chamber. In specific embodiments, the combustion chamber housing is configured to generate an output based on the heated compressed air or the heated combustion products.

In specific embodiments, the combustion chamber is configured to receive compressed air. In specific embodiments, electric heating elements within the combustion chamber are configured to heat the compressed air, a mixture of compressed air and fuel, or both, prior to combustion. In specific embodiments, the electric heating elements within the combustion chamber are configured to heat the combustion products of a mixture of compressed air and fuel after combustion. In certain embodiments, heating of the compressed air, a mixture of compressed air and fuel, combustion products, or a combination thereof, increases the heat, pressure, and thrust of the heated gas. In certain embodiments, the heated gas turns a gas turbine of the gas turbine engine. In certain embodiments, the increased heat, pressure, and thrust of the heated gas increase the speed at which the gas turbine turns.

In certain embodiments, the gas turbine is connected by a shaft to a primary compressor fan. In certain embodiments, heating the compressed air, a mixture of compressed air and fuel, combustion products of a mixture of compressed air and fuel, or a combination thereof, increases the pressure of the generated heated gas, which increases the speed at which the turbine turns and thereby increases the speed at which the primary compressor fan turns and thereby increases the pressure of the compressed air entering the combustion chamber.

In specific embodiments, a controller is configured to increase or decrease the heat generated by the one or more electric heating elements and thus the heat, pressure, and thrust of the heated gas.

Certain embodiments of the disclosure include gas turbine engine systems and methods useful for electricity production. In certain embodiments, a Simple Cycle gas turbine engine uses a gas turbine to spin an electric generator. In other embodiments, a Combined Cycle gas turbine engine spins a generator and also captures the exhaust heat from the gas turbine and sends it to a heat recovery system that creates steam for a steam turbine that turns a secondary generator or that can be used to assist in the powering of the primary generator.

In specific embodiments, a controller directs the electricity generated by either the primary and/or secondary generator to the one or more electric heating elements, an electrical grid, or the infrastructure of a power plant.

In certain embodiments of the disclosure, the gas turbine engine systems and methods are useful for propulsion systems, drive systems, and electricity production for land, air, water, and space vehicles. In certain embodiments of the disclosure, the gas turbine engine systems and methods are useful for primary and auxiliary systems.

In certain embodiments of the disclosure, the systems and methods are useful for generating jet engine power. In specific embodiments, systems and methods include a jet engine configured to drive a vehicle. In specific embodiments, the jet engine has a turbojet design. In certain embodiments, a compressor fan of the turbojet design is the same size as the opening of the combustion chamber. In specific embodiments, the jet engine has a turbofan design. In certain embodiments, an annular compression fan of the turbofan design is larger than the radius of the combustion chamber's air input opening.

In specific embodiments, the jet engine includes a combustion chamber housing having a housing wall defining a combustion chamber. In specific embodiments, the combustion chamber housing is configured to receive compressed air, to mix compressed air with fuel, and to ignite the mixture of compressed air and fuel to form combustion products of the mixture of compressed air and fuel. In specific embodiments, the electric heating elements within the combustion chamber are configured to heat the compressed air, the mixture of compressed air and fuel, the combustion products of the mixture of compressed air and fuel, or a combination thereof, to generate heated combustion products. In specific embodiments, the jet engine is configured to generate an exhaust output based on the heated gas. In certain embodiments, the heat, pressure, and thrust of the exhaust output may propel a vehicle.

In certain embodiments, heating the compressed air, the mixture of compressed air and fuel, the combustion products, or a combination thereof, within the combustion chamber, increases the heat, pressure, and thrust of the heated combustion products, which thereby increases the force of the thrust of the exhaust output and thereby increases the force of the jet engine propulsion.

In certain embodiments, a turbine of the jet engine is connected by a turbine shaft to a primary compressor fan. In certain embodiments, heating the compressed air, the mixture of compressed air and fuel, combustion products of the mixture of compressed air and fuel, or a combination thereof, increases the heat, pressure, and thrust of the heated combustion products, which increases the speed at which the turbine in a flow path of the heated combustion products rotates and thereby increases the speed at which the primary compressor fan turns and thereby increases the force of the thrust of the jet engine propulsion.

In specific embodiments, the jet engine is configured to force air into a combination of compressor blades (fans) and stator blades positioned upstream of the jet turbine which guide the high velocity air towards the jet turbine. In certain embodiments, the jet turbine is connected with a shaft or a combination of shafts to the compressor fan which turns the fan in tandem with the jet turbine. In certain embodiments, the shaft extends through the compressor fan and turns an electric generator/alternator covered and protected by a nose cone covers which also diverts the incoming air.

In certain embodiments, the primary compressor fan may be started by an electric motor to set into motion a process that creates jet engine propulsion. In certain embodiments, this fan may spin at a high rpm to send air through a stator that guides the flow of the air through a jet nacelle and the combustion chamber that ultimately force the air through a jet nozzle creating thrust that propels the vehicle.

In specific embodiments, solar panels may convert solar power to electricity. In certain embodiments the solar panels may be positioned on the top of a vehicle comprising the jet engine.

In specific embodiments, a controller is configured to direct the electricity that is generated by the electric generator and/or the solar panels to the one or more electric heating elements, a battery, the electric motor, or other parts of the vehicle as needed. In certain embodiments, a controller is configured to increase or decrease the heat generated by the one or more electric heating elements. In certain embodiments, the increase or decrease of the heat generated by the one or more electric heating elements within the combustion chamber controls the thrust of the jet engine.

In certain embodiments, an additional combustion chamber may be added as an afterburner. In certain embodiments, the jet engine is configured to force the exhaust output generated by the jet engine into the afterburner. In certain embodiments, the afterburner is configured to ignite a mixture of the exhaust output and fuel within the afterburner to generate afterburner combustion products.

In specific embodiments, the afterburner includes one or more second electric heating elements within the afterburner. In specific embodiments, the second electric heating elements heat the exhaust output, a mixture of the exhaust output and fuel, and/or afterburner combustion products of a mixture of the exhaust output and fuel to generate heated exhaust output or heated afterburner combustion products. In specific embodiments, the afterburner is configured to generate an afterburner exhaust output based on the heated exhaust output or the heated afterburner combustion products.

In certain embodiments, the afterburner increases the thrust of the vehicle temporarily if needed for take-offs, landings and other vital maneuvers.

In specific embodiments, the heated gas is forced through a nozzle which concentrates the heated combustion products and creates a powerful force that propels the vehicle forward. A moveable and/or adjustable thrust controller can be incorporated within the nozzle such that it directs the exhaust air thereby guiding the vehicle. This is an optional modification. A thrust reverser is attached to the nozzle that enables the thrust to be utilized to slow or stop the vehicle.

In specific embodiments, one or more auxiliary power units may be used to provide electricity to power the one or more electric heating elements of the combustion chamber and/or the afterburner.

III. Systems of the Disclosure

In specific embodiments of the disclosure, the electric systems and methods for a turbine engine are useful to generate electrical or mechanical power.

Turning to the figures, FIG. 1 illustrates a particular embodiment of a Simple Cycle gas turbine engine system 100 configured to generate electricity in a single electric generator 120.

Incoming compressed air first enters gas turbine engine 102. Compressed air is then directed into combustion chamber housing 104, which defines an internal combustion chamber. Combustion chamber housing 104 may mix compressed air with fuel and ignite the mixture within the combustion chamber to form combustion products. One or more electric heating elements 108 heat compressed air, a mixture of compressed air and fuel, combustion products of a mixture of compressed air and fuel, or a combination thereof, within the combustion chamber to produce heated compressed air or heated combustion products. Combustion chamber housing 104 generates an exhaust output based on the heated compressed air or heated combustion products. One or more gas turbine blades 112 in a flow path of the exhaust output spin based on the exhaust output. Gas turbine shaft 116 connected to one or more gas turbine blades 112 rotates based on the spinning of the one or more gas turbine blades 112. Rotation of gas turbine shaft 116 drives the production of electricity by electric generator 120, connected to gas turbine shaft 116. Electricity produced by electric generator 120 is directed to electric generator controller 130 through one or more connectors 124. Electric generator controller 130 may direct electricity to the one or more electric heating elements, an electrical grid, the infrastructure of a power plant, a vehicle, or a combination thereof.

Figure 2:
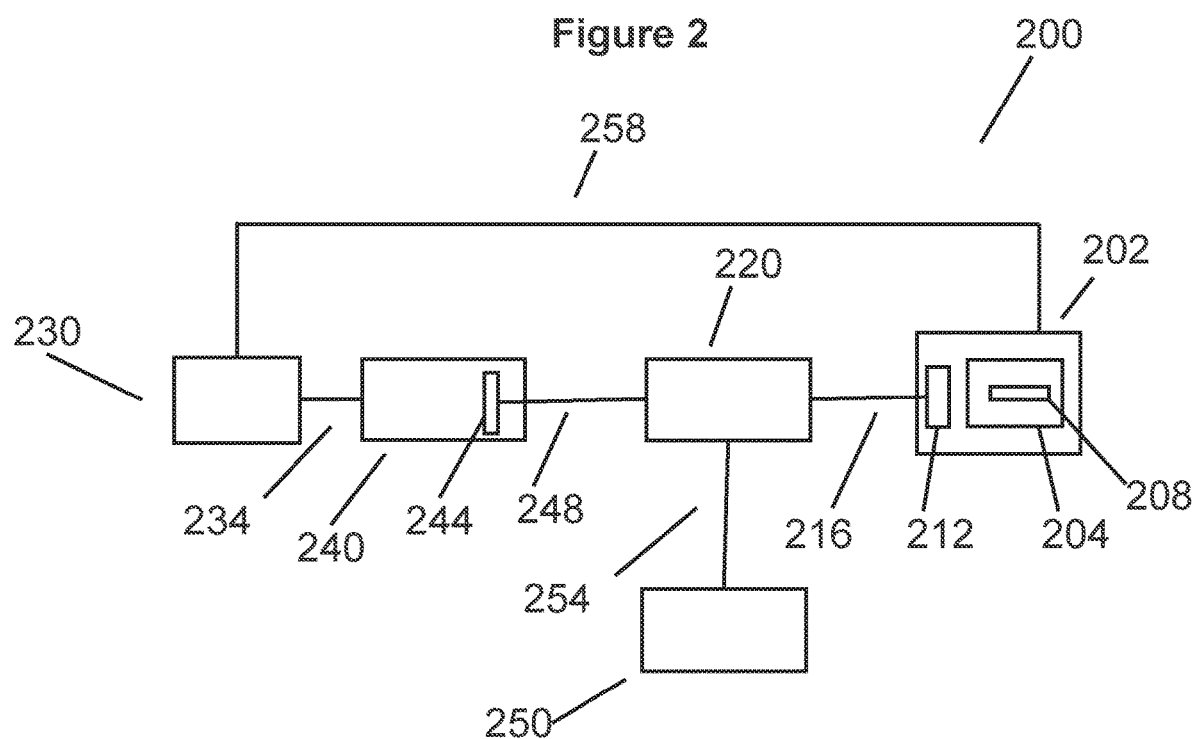
FIG. 2 illustrates a particular embodiment of the disclosure showing a Combined Cycle gas turbine engine system 200 configured to generate electricity in a single electric generator 220.

FIG. 2 illustrates a particular embodiment of the disclosure showing a Combined Cycle gas turbine engine system 200 configured to generate electricity in a single electric generator 220.

Incoming compressed air first enters gas turbine engine 202. Compressed air is then directed into combustion chamber housing 204, which defines an internal combustion chamber. Combustion chamber housing 204 may mix compressed air with fuel and ignite the mixture to form combustion products. One or more electric heating elements 208 heat compressed air, a mixture of compressed air and fuel, combustion products of a mixture of compressed air and fuel, or a combination thereof, within the combustion chamber, to produce heated compressed air or heated combustion products. Combustion chamber housing 204 generates an exhaust output based on the heated compressed air or heated combustion products. One or more gas turbine blades 212 in a flow path of the exhaust output pin based on the exhaust output. Gas turbine shaft 216 connected to one or more gas turbine blades 212 rotates based on the spinning of the one or more gas turbine blades. Rotation of gas turbine shaft 216 drives the production of electricity by electric generator 220, connected to gas turbine shaft 216. Electricity produced by electric generator 220 is directed to electric generator controller 250 through one or more connectors 254. Electric generator controller 250 may direct electricity to the one or more electric heating elements, an electrical grid, the infrastructure of a power plant, a vehicle, or a combination thereof.

The exhaust output of gas turbine engine 202 is directed to heat recovery system 230 through one or more connectors 258. Heat recovery system 230 converts the heat of the exhaust output into steam. Heat recovery system 230 directs the steam into steam turbine engine 240 through one or more connectors 234. One or more steam turbine blades 244 in a flow path of the steam spin based on the steam. Steam turbine shaft 248 connected to the one or more steam turbine blades 244 rotates based on the spinning of one or more steam turbine blades 244. Rotation of steam turbine shaft 248 drives the production of additional electricity by electric generator 220 connected to steam turbine shaft 248.

Figure 3:
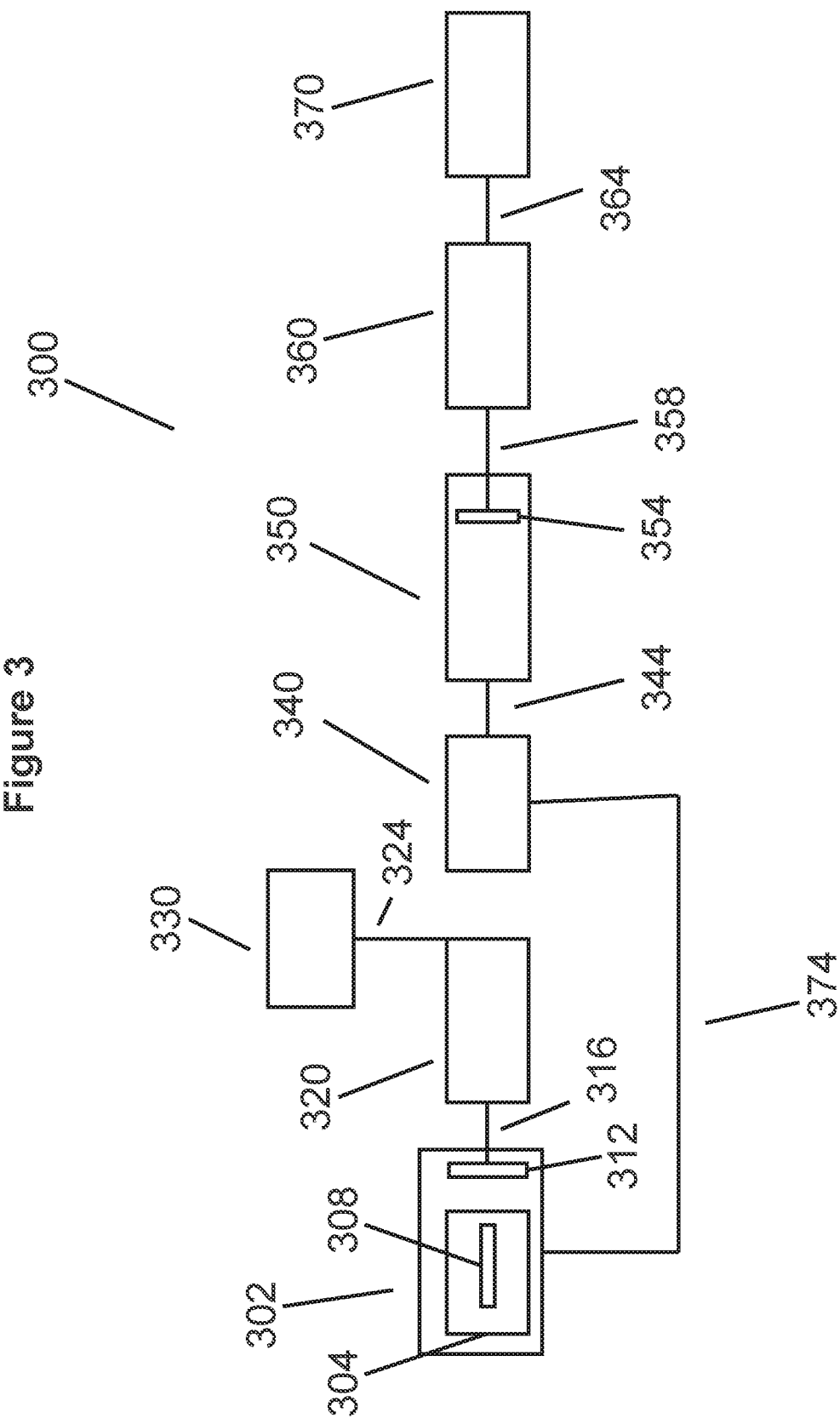
FIG. 3 illustrates a particular embodiment of the disclosure showing a Combined Cycle gas turbine engine system 300 configured to generate electricity in electric generators 320 and 360.

FIG. 3 illustrates a particular embodiment of the disclosure showing a Combined Cycle gas turbine engine system 300 configured to generate electricity in generators 320 and 360.

Incoming compressed air first enters gas turbine engine 302. Compressed air next is directed into combustion chamber housing 304 which defines an internal combustion chamber. Combustion chamber housing 304 may mix compressed air with fuel and ignite the mixture to form combustion products. One or more electric heating elements 308 heat compressed air, a mixture of compressed air and fuel, combustion products of a mixture of compressed air and fuel, or a combination thereof, within the combustion chamber, to produce heated compressed air or heated combustion products. Combustion chamber housing 304 generates an exhaust output based on the heated compressed air or the heated combustion products. One or more gas turbine blades 312 in a flow path of the exhaust output spin based on the exhaust output. Gas turbine shaft 316 connected to one or more gas turbine blades 312 rotates based on the spinning of one or more gas turbine blades 312. Rotation of gas turbine shaft 316 drives the production of electricity by first electric generator 320 connected to gas turbine shaft 316. Electricity produced by first electric generator 320 is directed to first electric generator controller 330 through one or more connectors 324. First electric generator controller 330 may direct electricity to the one or more electric heating elements, an electrical grid, the infrastructure of a power plant, a vehicle, or a combination thereof.

The exhaust output of gas turbine engine 302 is directed to heat recovery system 340 through one or more connectors 374. Heat recovery system 340 converts the heat of the exhaust output into steam. The steam is directed into the steam turbine engine 350 through one or more connectors 344. One or more steam turbine blades 354 in a flow path of the steam spin based on the steam and steam turbine shaft 358 connected to one or more steam turbine blades 354 rotates based on the spinning of one or more steam turbine blades 345. Rotation of steam turbine shaft 358 drives the production of electricity by second electric generator 360 connected to steam turbine shaft 358. Electricity produced by second electric generator 360 is directed to second electric generator controller 370 through one or more connectors 364. Second electric generator controller 370 may direct electricity to the one or more electric heating elements, an electrical grid, the infrastructure of a power plant, a vehicle, or a combination thereof.

Figure 4:
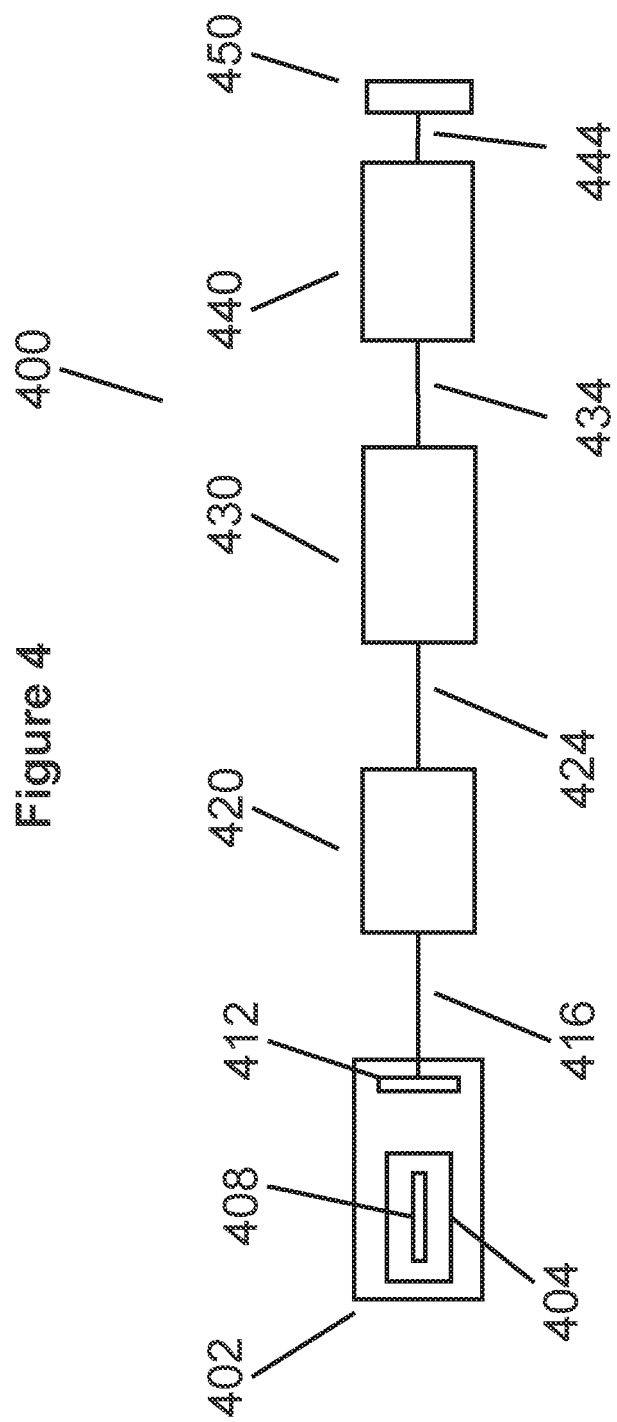
FIG. 4 illustrates a particular embodiment of the disclosure showing a Simple Cycle gas turbine engine system 400 configured to generate electricity in a single electric generator 420 to further generate propulsion without using a pod.

FIG. 4 illustrates a particular embodiment of the disclosure showing a Simple Cycle gas turbine engine system 400 configured to generate electricity in a single electric generator 420 to further generate propulsion without using a pod.

Incoming compressed air first enters gas turbine engine 402. Compressed air is then directed into combustion chamber housing 404, which defines an internal combustion chamber. Combustion chamber housing 404 may mix compressed air with fuel and ignite the mixture within the combustion chamber to form combustion products. One or more electric heating elements 408 heat compressed air, a mixture of compressed air and fuel, combustion products of a mixture of compressed air and fuel, or a combination thereof, within the combustion chamber, to produce heated compressed air or heated combustion products. Combustion chamber housing 404 generates an exhaust output based on the heated compressed air or the heated combustion products. One or more gas turbine blades 412 in a flow path of the exhaust output spin based on the exhaust output. Gas turbine shaft 416 connected to one or more gas turbine blades 412 rotates based on the spinning of one or more gas turbine blades 412. Rotation of gas turbine shaft 416 drives the production of electricity by electric generator 420 connected to gas turbine shaft 416. Electricity produced by electric generator 420 is directed to electric generator controller 430 through one or more connectors 424. Electric generator controller 430 may direct electricity to the one or more electric heating elements, the internal operations of a vehicle, or a combination thereof.

Electric generator controller 430 further directs electricity to electric motor 440 through one or more connectors 434. Electric motor 440 converts electricity into torque and applies said torque to propeller shaft 444. Propeller shaft 444 connected to electric motor 440 rotates based on the torque applied to the propeller shaft 444. One or more propeller blades 450 connected to propeller shaft 444 spin based on rotation of propeller shaft 444. One or more propeller blades 450 may propel a vehicle through spinning.

Figure 5:
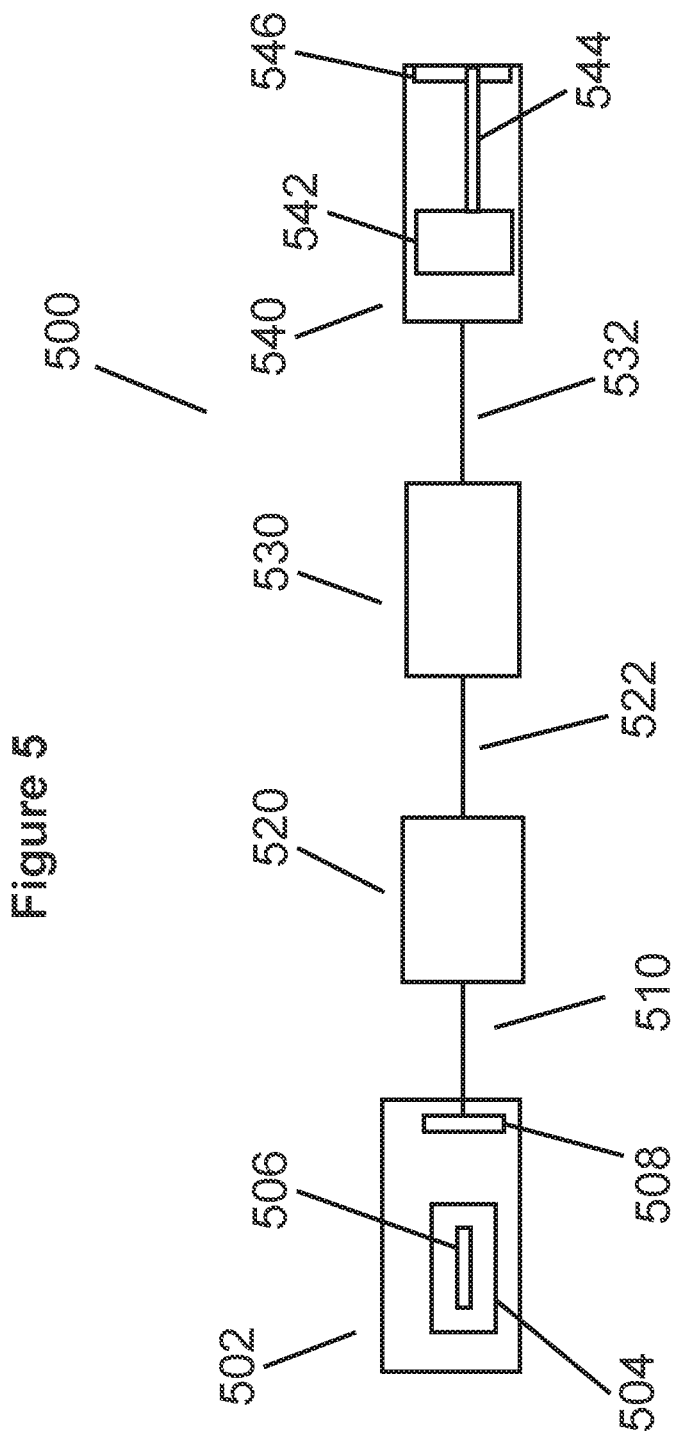
FIG. 5 illustrates a particular embodiment of the disclosure showing a Simple Cycle gas turbine engine system 500 configured to generate electricity in a single electric generator 520 to further generate propulsion using a pod 540.

FIG. 5 illustrates a particular embodiment of the disclosure showing a Simple Cycle gas turbine engine system 500 configured to generate electricity in a single electric generator 520 to further generate propulsion using a pod 540.

Incoming compressed air first enters gas turbine engine 502. Compressed air is then directed into combustion chamber housing 504, which defines an internal combustion chamber. Combustion chamber housing 504 may mix compressed air with fuel and ignite the mixture within the combustion chamber to form combustion products. One or more electric heating elements 506 heat compressed air, a mixture of compressed air and fuel, combustion products of a mixture of compressed air and fuel, or a combination thereof, within the combustion chamber, to produce heated compressed air or heated combustion products. Combustion chamber housing 504 generates an exhaust output based on the heated compressed air or the heated combustion products. One or more gas turbine blades 508 in a flow path of the exhaust output spin based on the exhaust output. Gas turbine shaft 510 connected to one or more gas turbine blades 508 rotates based on the spinning of one or more gas turbine blades 510. Rotation of gas turbine shaft 510 drives the production of electricity by electric generator 520 connected to gas turbine shaft 510. Electricity produced by electric generator 520 is directed to electric generator controller 530 through one or more connectors 522. Electric generator controller 530 may direct electricity to the one or more electric heating elements, the internal operations of a vehicle, or a combination thereof.

Controller 530 further directs electricity to pod 540 through one or more connectors 532. Pod 540 directs electricity to electric motor 542 within pod 540. Electric motor 542 converts electricity into torque and applies said torque to propeller shaft 544 within pod 540 and connected to electric motor 542. Propeller shaft 544 rotates based on the torque applied to propeller shaft 544. One or more propeller blades 546 connected to propeller shaft 544 spin based on rotation of propeller shaft 544. One or more propeller blades 546 propel a vehicle through spinning.

Figure 6:
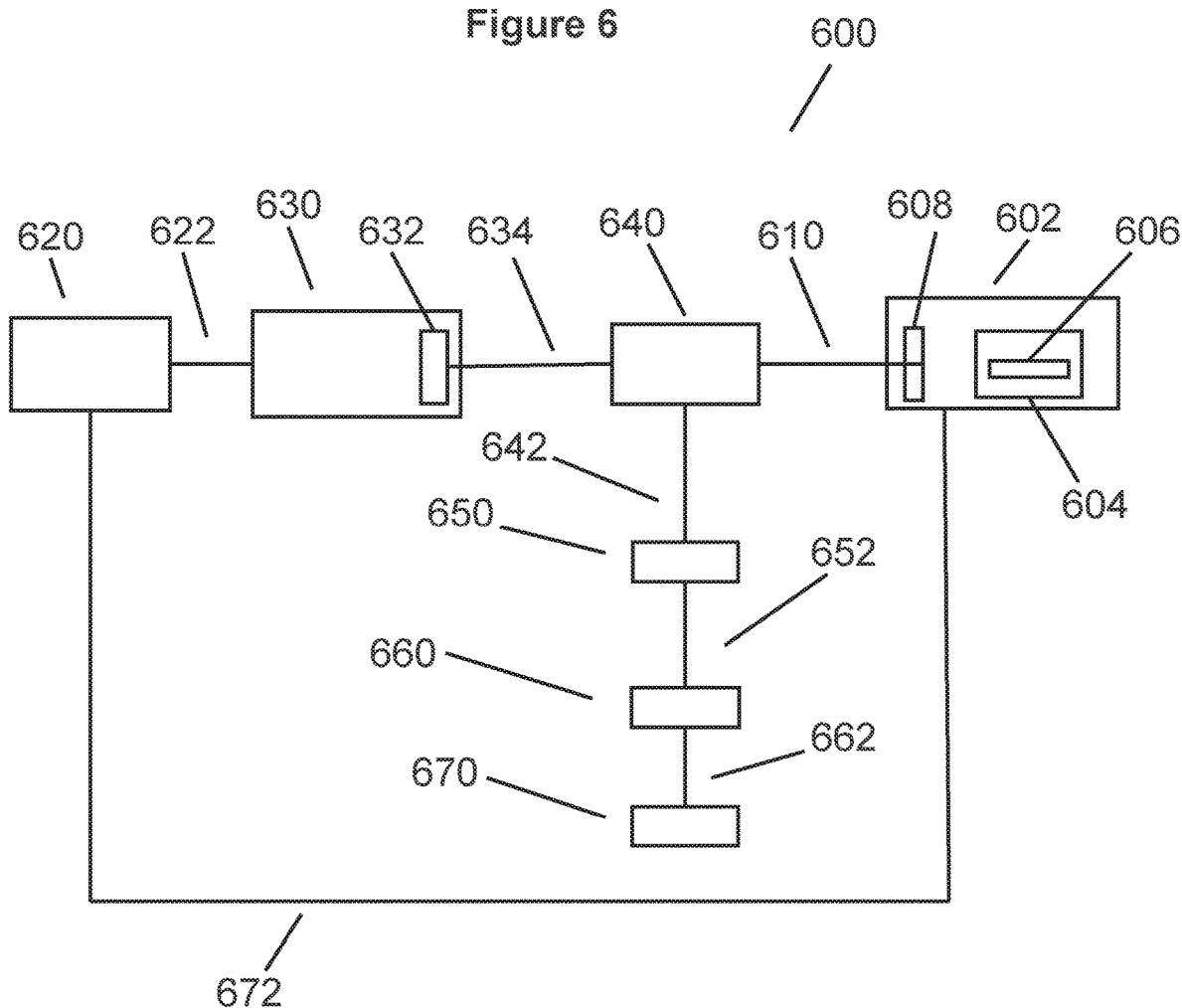
FIG. 6 illustrates a particular embodiment of the disclosure showing a Combined Cycle gas turbine engine system 600 configured to generate electricity in a single electric generator 640 to further generate propulsion without using a pod.

FIG. 6 illustrates a particular embodiment of the disclosure showing a Combined Cycle gas turbine engine system 600 configured to generate electricity in a single generator 640 and to further generate propulsion without using a pod.

Incoming compressed air first enters gas turbine engine 602. Compressed air is then directed into combustion chamber housing 604, which defines an internal combustion chamber. Combustion chamber housing 604 may mix compressed air with fuel and ignite the mixture within the combustion chamber to form combustion products. One or more electric heating elements 606 heat compressed air, a mixture of compressed air and fuel, combustion products of a mixture of compressed air and fuel, or a combination thereof, within the combustion chamber, to produce heated compressed air or heated combustion products. Combustion chamber housing 604 generates an exhaust output based on the heated compressed air or the heated combustion products. One or more gas turbine blades 608 in a flow path of the exhaust output spin based on the exhaust output. Gas turbine shaft 610 connected to one or more gas turbine blades 608 rotates based on the spinning of one or more gas turbine blades 610. Rotation of gas turbine shaft 610 drives the production of electricity by electric generator 640 connected to gas turbine shaft 610. Electricity produced by electric generator 640 is directed to electric generator controller 650 through one or more connectors 642. Electric generator controller 650 may direct electricity to the one or more electric heating elements, the internal operations of a vehicle, or a combination thereof.

Controller 650 further directs electricity to electric motor 660 through one or more connectors 652. Electric motor 652 converts the electricity into torque and applies said torque to propeller shaft 662 connected to electric motor 652. Propeller shaft 662 rotates based on the torque applied to propeller shaft 662. One or more propeller blades 670 connected to propeller shaft 662 spin based on the rotation of propeller shaft 662. One or more propeller blades 670 propel a vehicle through spinning.

The exhaust output of the gas turbine engine 602 is directed to heat recovery system 620 through one or more connectors 672. Heat recovery system 620 converts the heat of the exhaust output into steam. The steam is directed to the steam turbine engine 630 through one or more connectors 622. One or more steam turbine blades 632 in a flow path of the steam spin based on the steam. Steam turbine shaft 634 connected to one or more steam turbine blades 632 rotates based on the spinning of one or more steam turbine blades 632. Rotation of steam turbine shaft 634 drives the production of electricity by generator 640 connected to steam turbine shaft 634.

Figure 7:
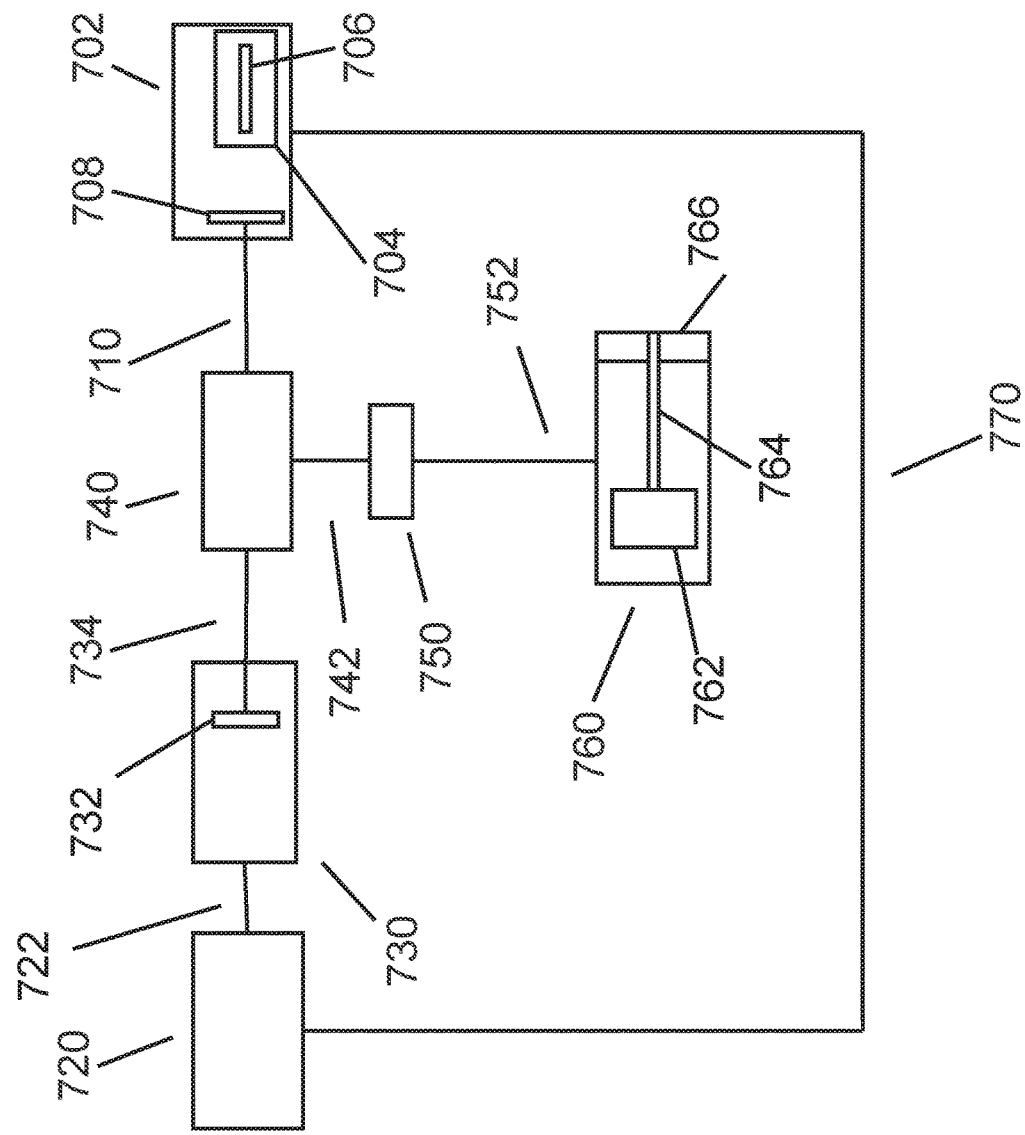
FIG. 7 illustrates a particular embodiment of the disclosure showing a Combined Cycle gas turbine engine system 700 configured to generate electricity in a single electric generator 740 to further generate propulsion using a pod 760.

FIG. 7 illustrates a particular embodiment of the disclosure showing a Combined Cycle gas turbine engine system 700 configured to generate electricity in a single electric generator 740 to further generate propulsion using a pod 760.

Incoming compressed air first enters gas turbine engine 702. Compressed air is then directed into combustion chamber housing 704, which defines an internal combustion chamber. Combustion chamber housing 704 may mix compressed air with fuel and ignite the mixture within the combustion chamber to form combustion products. One or more electric heating elements 706 heat compressed air, a mixture of compressed air and fuel, combustion products of a mixture of compressed air and fuel, or a combination thereof, within the combustion chamber, to produce heated compressed air or heated combustion products. Combustion chamber housing 704 generates an exhaust output based on the heated compressed air or the heated combustion products. One or more gas turbine blades 708 in a flow path of the exhaust output spin based on the exhaust output. Gas turbine shaft 710 connected to one or more gas turbine blades 708 rotates based on the spinning of one or more gas turbine blades 710. Rotation of gas turbine shaft 710 drives the production of electricity by electric generator 740 connected to gas turbine shaft 710. Electricity produced by electric generator 740 is directed to electric generator controller 750 through one or more connectors 742. Electric generator controller 750 may direct electricity to the one or more electric heating elements, the internal operations of a vehicle, or a combination thereof.

Controller 750 further directs electricity to pod 760 through one or more connectors 742. Pod 760 directs electricity to electric motor 762 within pod 760. Electric motor 762 converts electricity into torque and applies said torque to propeller shaft 764 within pod 760 and connected to electric motor 762. Propeller shaft 764 rotates based on the torque applied to propeller shaft 764. One or more propeller blades 766 within pod 760 and connected to propeller shaft 764 spin based on the rotation of propeller shaft 764. One or more propeller blades 766 propel a vehicle through spinning.

The exhaust output of the gas turbine engine 702 is directed to heat recovery system 720 through one or more connectors 770. Heat recovery system 720 converts the heat of the exhaust output into steam. The steam is directed into steam turbine engine 730 through one or more connectors 722. One or more steam turbine blades 732 in a flow path of the steam spin based on the steam. Steam turbine shaft 734 connected to one or more steam turbine blades 732 rotates based on the spinning of one or more steam turbine blades 732. Rotation of steam turbine shaft 734 drives the production of electricity by electric generator 740 connected to steam turbine shaft 734.

Figure 8:
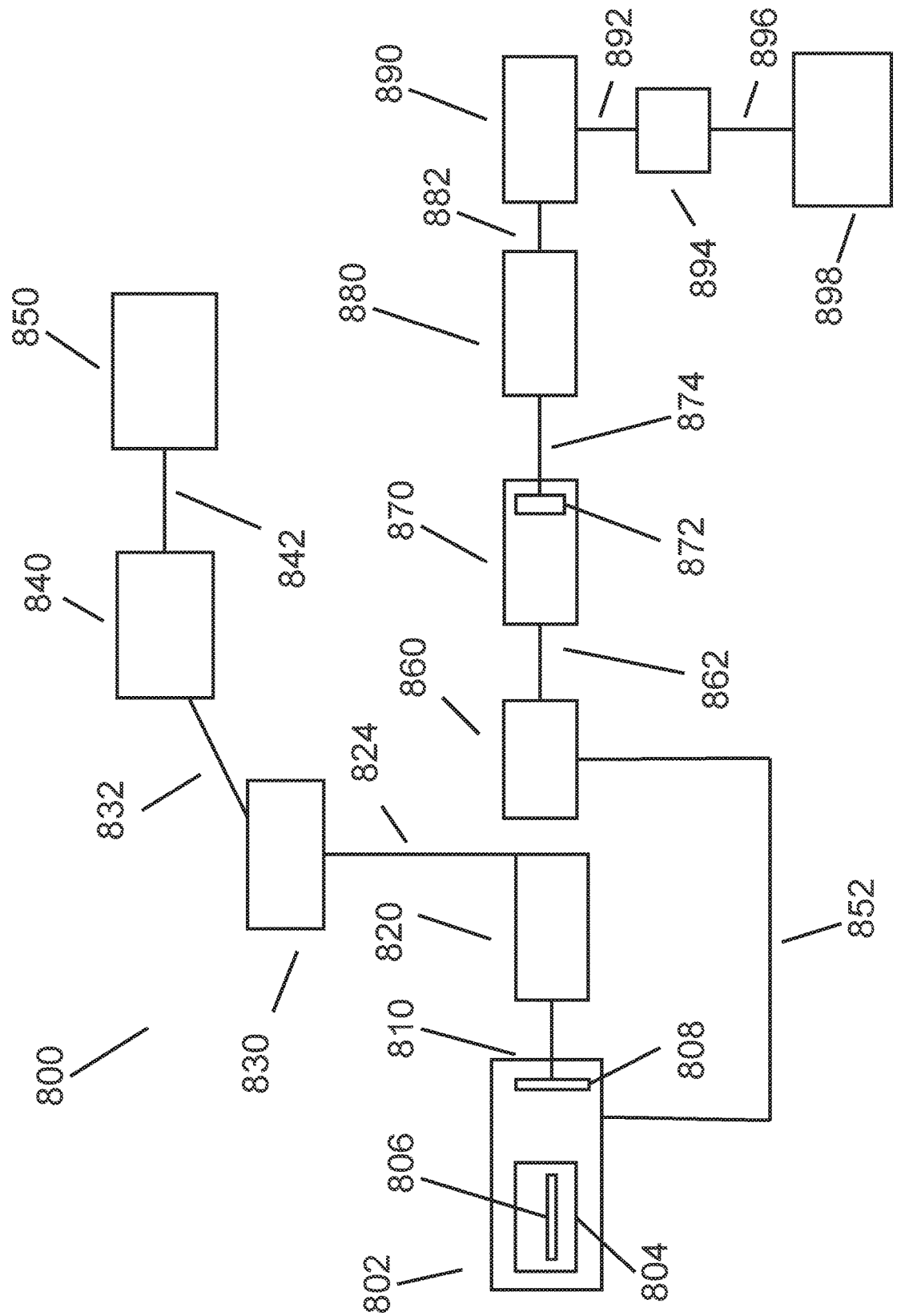
FIG. 8 illustrates a particular embodiment of the disclosure showing a Combined Cycle gas turbine engine system 800 configured to separately generate electricity in electric generators 820 and 880 to further separately generate propulsion without using a pod.

FIG. 8 illustrates a particular embodiment of the disclosure showing a Combined Cycle gas turbine engine system 800 configured to separately generate electricity in generators 820 and 880 to further separately generate propulsion without a pod.

Incoming compressed air first enters gas turbine engine 802. Compressed air is then directed into combustion chamber housing 804, which defines an internal combustion chamber. Combustion chamber housing 804 may mix compressed air with fuel and ignite the mixture within the combustion chamber to form combustion products. One or more electric heating elements 806 heat compressed air, a mixture of compressed air and fuel, combustion products of a mixture of compressed air and fuel, or a combination thereof, within the combustion chamber, to produce heated compressed air or heated combustion products. Combustion chamber housing 804 generates an exhaust output based on the heated compressed air or the heated combustion products. One or more gas turbine blades 808 in a flow path of the exhaust output spin based on the exhaust output. Gas turbine shaft 810 connected to one or more gas turbine blades 808 rotates based on the spinning of one or more gas turbine blades 808. Rotation of gas turbine shaft 810 drives the production of electricity by electric generator 820 connected to gas turbine shaft 810. Electricity produced by electric generator 820 is directed to electric generator controller 830 through one or more connectors 824. Electric generator controller 830 may direct electricity to the one or more electric heating elements, the internal operations of a vehicle, or a combination thereof.

Electric generator controller 830 further directs electricity to electric motor 840 through one or more connectors 832. Electric motor 840 converts electricity into torque and applies said torque to propeller shaft 842. Propeller shaft 842 connected to electric motor 840 rotates based on the torque applied to the propeller shaft 842. One or more propeller blades 850 connected to propeller shaft 842 spin based on rotation of propeller shaft 842. One or more propeller blades 850 may propel a vehicle through spinning.

The exhaust output of the gas turbine engine 802 is directed to heat recovery system 860 through one or more connectors 852. The heat recovery system converts the heat of the exhaust output into steam. The steam is directed into the steam turbine engine 870 through one or more connectors 862. One or more steam turbine blades 872 in a flow path of the steam spin based on the steam. Steam turbine shaft 874 connected to one or more steam turbine blades 872 rotates based on the spinning of the one or more steam turbine blades 872. Rotation of steam turbine shaft 874 drives the production of electricity by second generator 880 connected to steam turbine shaft 874. Electricity produced by second generator 880 is directed to second controller 890 through one or more connectors 882. Second controller 890 may direct electricity to the one or more electric heating elements, an electrical grid, the infrastructure of a power plant, a vehicle, or a combination thereof.

Second controller 890 further directs electricity to second electric motor 894 through one or more connectors 892. Second electric motor 894 converts electricity into torque and applies said torque to second propeller shaft 896. Second propeller shaft 896 rotates based on the torque applied to second propeller shaft 896. One or more second propeller blades 898 connected to second propeller shaft 896 spin based on rotation of the second propeller shaft 896. One or more second propeller blades 898 propel a vehicle through spinning.

Figure 9:
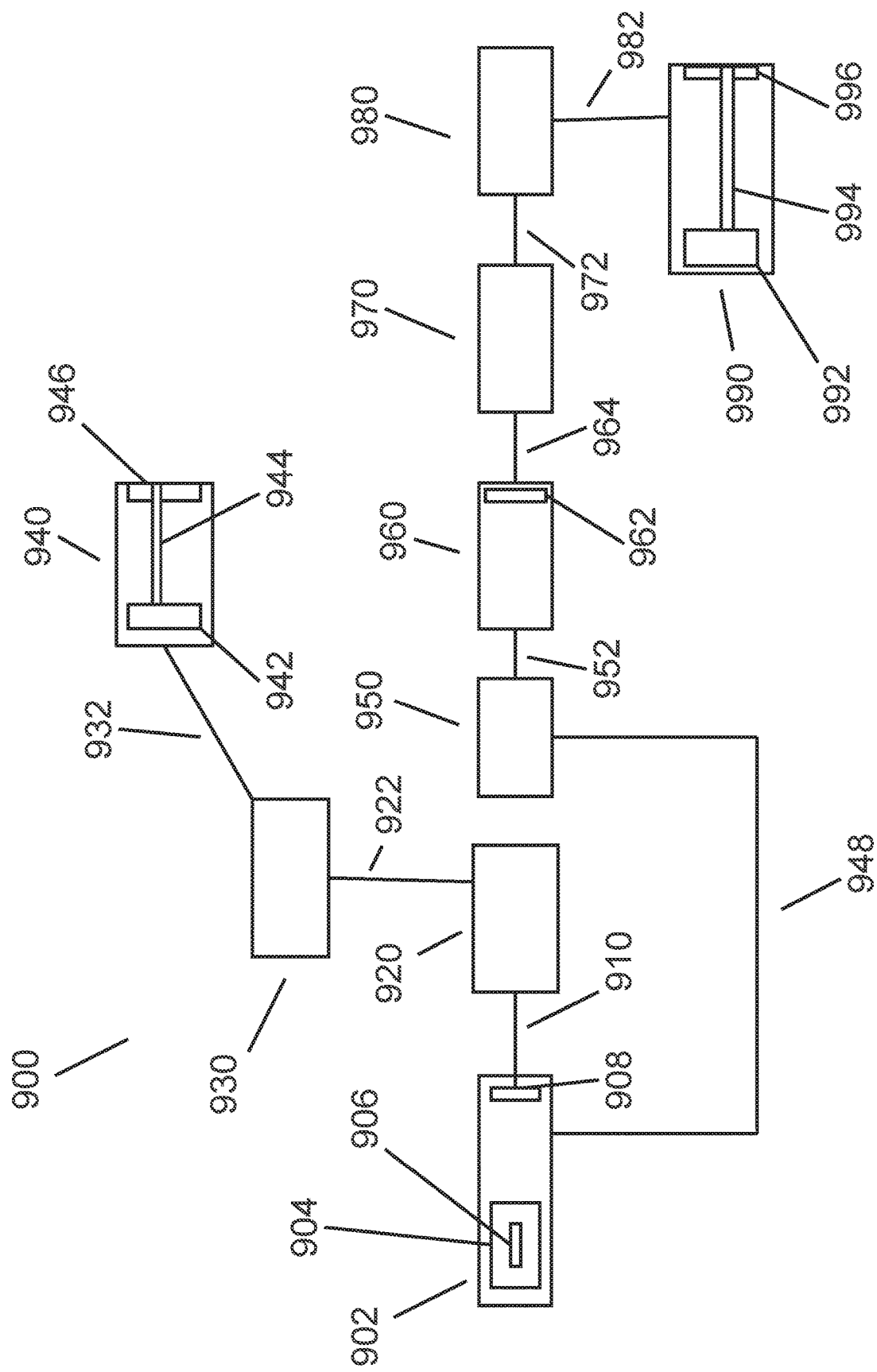
FIG. 9 illustrates a particular embodiment of the disclosure showing a Combined Cycle gas turbine engine system 900 configured to separately generate electricity in electric generators 920 and 970 to further separately generate propulsion using pods 940 and 990, respectively.

FIG. 9 illustrates a particular embodiment of the disclosure showing a Combined Cycle gas turbine engine system 900 configured to separately generate electricity in generators 920 and 970 to further separately generate propulsion using pods 940 and 990, respectively.

Incoming compressed air first enters gas turbine engine 902. Compressed air is then directed into combustion chamber housing 904, which defines an internal combustion chamber. Combustion chamber housing 904 may mix compressed air with fuel and ignite the mixture within the combustion chamber to form combustion products. One or more electric heating elements 906 heat compressed air, a mixture of compressed air and fuel, combustion products of a mixture of compressed air and fuel, or a combination thereof, within the combustion chamber, to produce heated compressed air or heated combustion products. Combustion chamber housing 904 generates an exhaust output based on the heated compressed air or the heated combustion products. One or more gas turbine blades 908 in a flow path of the exhaust output spin based on the exhaust output. Gas turbine shaft 910 connected to one or more gas turbine blades 908 rotates based on the spinning of one or more gas turbine blades 908. Rotation of gas turbine shaft 910 drives the production of electricity by electric generator 920 connected to gas turbine shaft 910. Electricity produced by electric generator 920 is directed to electric generator controller 930 through one or more connectors 922. Electric generator controller 930 may direct electricity to the one or more electric heating elements, the internal operations of a vehicle, or a combination thereof.

First controller 930 further directs electricity to first pod 940 through one or more connectors 932. First pod 940 directs electricity to first electric motor 942 within first pod 940. First electric motor 942 within first pod 940 converts electricity into torque and applies said torque to first propeller shaft 944 within first pod 940 and connected to first electric motor 942. First propeller shaft 944 rotates based on the torque applied to first propeller shaft 922. One or more first propeller blades 946 within first pod 940 and connected to first propeller shaft 944 spin based on rotation of first propeller shaft 944. One or more first propeller blades 946 propel a vehicle through spinning.

The exhaust output of the gas turbine engine 902 is directed to heat recovery system 950 through one or more connectors 948. The heat recovery system converts the heat of the exhaust output into steam. The steam is directed into the steam turbine engine 960 through one or more connectors 952. One or more steam turbine blades 962 in a flow path of the steam spin based on the steam. Steam turbine shaft 964 connected to one or more steam turbine blades 962 rotates based on the spinning of the one or more steam turbine blades 962. Rotation of steam turbine shaft 964 drives the production of electricity by second generator 970 connected to steam turbine shaft 964. Electricity produced by second generator 970 is directed to second controller 980 through one or more connectors 972. Second controller 980 may direct electricity to the one or more electric heating elements, an electrical grid, the infrastructure of a power plant, a vehicle, or a combination thereof.

Second controller 980 further directs electricity to second pod 990 through one or more connectors 982. Second pod 990 directs electricity to second electric motor 992 within second pod 990. Second electric motor 992 converts electricity into torque and applies said torque to second propeller shaft 994 within second pod 990 and connected to second electric motor 992. Second propeller shaft 994 rotates based on the torque applied to second propeller shaft 994. One or more second propeller blades 996 within second pod 990 and connected to second propeller shaft 994 spin based on rotation of second propeller shaft 994. One or more second propeller blades 996 propel a vehicle through spinning.

FIG. 10 illustrates a particular embodiment of the disclosure showing a Single Cycle gas turbine engine system 1000 configured to use power turbine 1010 to directly generate mechanical power by rotation of power shaft 1014.

Incoming compressed air first enters gas turbine engine 1002. Compressed air is then directed into combustion chamber housing 1004, which defines an internal combustion chamber. Combustion chamber housing 1004 may mix compressed air with fuel and ignite the mixture within the combustion chamber to form combustion products. One or more electric heating elements 1006 heat compressed air, a mixture of compressed air and fuel, combustion products of a mixture of compressed air and fuel, or a combination thereof, within the combustion chamber, to produce heated compressed air or heated combustion products. Combustion chamber housing 1004 generates an exhaust output based on the heated compressed air or the heated combustion products. Gas turbine engine 1002 directs the exhaust output into power turbine engine 1010. One or more power turbine blades 1012 within a flow path of the exhaust output spin based on the exhaust output. Power turbine shaft 1014 connected to one or more power turbine blades 1012 rotated based on the spinning of one or more power turbine blades 1012. Rotation of power turbine shaft 1014 generates mechanical power. Power turbine shaft 1014 may drive a vehicle or an auxiliary power unit.

FIG. 11 illustrates a particular embodiment of the disclosure showing a Single Cycle gas turbine engine system 1100 configured to use gas turbine engine 1102 to directly generate mechanical power through rotation of gas turbine shaft 1110.

Incoming compressed air first enters gas turbine engine 1102. Compressed air is then directed into combustion chamber housing 1104, which defines an internal combustion chamber. Combustion chamber housing 1104 may mix compressed air with fuel and ignite the mixture within the combustion chamber to form combustion products. One or more electric heating elements 1106 heat compressed air, a mixture of compressed air and fuel, combustion products of a mixture of compressed air and fuel, or a combination thereof, within the combustion chamber, to produce heated compressed air or heated combustion products. Combustion chamber housing 1104 generates an exhaust output based on the heated compressed air or the heated combustion products. One or more gas turbine blades 1108 in a flow path of the exhaust output spin based on the exhaust output. Gas turbine shaft 1110 connected to one or more gas turbine blades 1108 rotates based on the spinning of one or more gas turbine blades 1108. Rotation of gas turbine shaft 1110 generates mechanical power. Gearbox 1120 connected to gas turbine shaft 1110 transfers the mechanical power of rotation to gearbox shaft 1122 connected to gearbox 1120. Gearbox 1120 also controls the rotation of gearbox shaft 1122. One or more propeller blades 1130 connected to gearbox shaft 1122 spin based on rotation of the gearbox shaft 1122. One or more propeller blades 1130 propel a vehicle through spinning.

FIG. 12 illustrates a particular embodiment of the disclosure showing a jet engine system 1200.

Incoming compressed air first enters jet engine 1202. Compressed air then is directed into combustion chamber housing 1204, which defines an internal combustion chamber. Combustion chamber housing 1204 mixes compressed air with fuel and ignites the mixture to form combustion products. Combustion chamber 1204 generates an exhaust output based on the combustion products. Combustion chamber housing 1204 may include one or more electric heating elements 1206 within the combustion chamber. One or more electric heating elements 1206 heat compressed air, a mixture of compressed air and fuel, combustion products of a mixture of compressed air and fuel, or a combination thereof, within the combustion chamber, to produce heated combustion products. Combustion chamber housing 1204 generates an exhaust output based on the heated combustion products. The thrust of the exhaust output may be used to propel a vehicle.

Jet engine 1202 may direct the exhaust output into afterburner 1220 coupled to jet engine 1202. Afterburner 1220 may mix the exhaust output with fuel and ignite the mixture to form afterburner combustion products. Afterburner 1220 may include one or more second electric heating elements 1222 within afterburner 1220. One or more second electric heating elements 1222 heat exhaust output, a mixture of exhaust output and fuel, afterburner combustion products of exhaust output and fuel, or a combination thereof, within afterburner 1220, to produce heated exhaust output or heated afterburner combustion products. Afterburner 1220 generates an afterburner exhaust output based on the heated exhaust output or heated afterburner combustion products. The thrust of the afterburner exhaust output may be used to propel a vehicle.

Although the present disclosure and its advantages have been described in detail, it should be understood that various changes, substitutions and alterations can be made herein without departing from the disclosure as defined by the claims. Moreover, the scope of the present application is not intended to be limited to particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the claims are intended to include within their scope such processes, machines, manufacture, compositions of matter, means, methods, or steps.

What is claimed is:
1. A gas turbine engine, comprising:
a combustion chamber housing comprising a housing wall defining a combustion chamber within the combustion chamber housing;
one or more electric heating elements within the combustion chamber, wherein the one or more electric heating elements are configured to heat compressed air, a mixture of compressed air and fuel, combustion products of a mixture of compressed air and fuel, or a combination thereof, within the combustion chamber, to generate heated compressed air or heated combustion products, and wherein the combustion chamber housing is configured to generate an exhaust output based on the heated compressed air or the heated combustion products;
one or more gas turbine blades in a flow path of the exhaust output generated by the combustion chamber housing, wherein the gas turbine blades are configured to spin based on the exhaust output generated by the combustion chamber housing;
a gas turbine shaft connected to the one or more gas turbine blades, wherein the gas turbine shaft is configured to rotate based on the spinning of the one or more gas turbine blades, and wherein the gas turbine shaft is configured to generate mechanical power through rotation;
an electric generator connected to the gas turbine shaft, wherein the electric generator is configured to convert the mechanical power of rotation of the gas turbine shaft into electricity;

an electric generator controller coupled to the electric generator, wherein the electric generator is configured to direct the electricity generated by the electric generator to the electric generator controller through one or more connectors;

a pod coupled to the electric generator controller, wherein the electric generator controller is configured to direct the electricity received from the electric generator to the pod through one or more connectors;

an electric motor within the pod, wherein the pod is configured to direct the electricity received from the electric generator controller to the electric motor, and wherein the electric motor is configured to convert the electricity received from the pod into torque;

a propeller shaft within the pod and connected to the electric motor, wherein the electric motor is configured to apply the torque generated by the electric motor to the propeller shaft, and wherein the propeller shaft is configured to rotate based on the torque applied to the propeller shaft; and one or more propeller blades within the pod and connected to the propeller shaft, wherein the one or more propeller blades are configured to spin based on the rotation of the propeller shaft, and wherein the one or more propeller blades are configured to generate propulsion through spinning.

2. The gas turbine engine system of claim 1, wherein the one or more electric heating elements comprise molybdenum disilicide, silicon carbide, or a combination thereof.

3. A gas turbine engine, comprising:

a combustion chamber housing comprising a housing wall defining a combustion chamber within the combustion chamber housing;

one or more electric heating elements within the combustion chamber, wherein the one or more electric heating elements are configured to heat compressed air, a mixture of compressed air and fuel, combustion products of a mixture of compressed air and fuel, or a combination thereof, within the combustion chamber, to generate heated compressed air or heated combustion products, and wherein the combustion chamber housing is configured to generate an exhaust output based on the heated compressed air or the heated combustion products;

one or more gas turbine blades in a flow path of the exhaust output generated by the combustion chamber housing, wherein the gas turbine blades are configured to spin based on the exhaust output generated by the combustion chamber housing;

a gas turbine shaft connected to the one or more gas turbine blades, wherein the gas turbine shaft is configured to rotate based on the spinning of the one or more gas turbine blades, and wherein the gas turbine shaft is configured to generate mechanical power through rotation;

an electric generator connected to the gas turbine shaft, wherein the electric generator is configured to convert the mechanical power of rotation of the gas turbine shaft into electricity;

an electric generator controller coupled to the electric generator, wherein the electric generator is configured to direct the electricity generated by the electric generator to the electric generator controller through one or more connectors;

a heat recovery system coupled to the gas turbine engine, wherein the gas turbine engine is configured to direct the exhaust output generated by the combustion chamber housing to the heat recovery system through one or more connectors; and wherein the heat recovery system is configured to convert the heat of the exhaust output received from the gas turbine engine into steam;

a steam turbine engine coupled to the heat recovery system, wherein the heat recovery system is configured to direct the steam generated by the heat recovery system to the steam turbine engine through one or more connectors; and wherein the steam turbine engine comprises:

one or more steam turbine blades in a flow path of the steam generated by the heat recovery system, wherein the one or more steam turbine blades are configured to spin based on the steam generated by the heat recovery system; and a steam turbine shaft connected to the one or more steam turbine blades and to the electric generator, wherein the steam turbine shaft is configured to rotate based on the spinning of the one or more steam turbine blades, and wherein the steam turbine shaft is configured to generate mechanical power through rotation;

wherein the electric generator is configured to convert, the mechanical power of rotation of the steam turbine shaft into electricity.

4. The gas turbine engine system of claim 3, wherein the one or more electric heating elements comprise molybdenum disilicide, silicon carbide; or a combination thereof.

5. A gas turbine engine, comprising:

a combustion chamber housing comprising a housing wall defining a combustion chamber within the combustion chamber housing;

one or more electric heating elements within the combustion chamber, wherein the one or more electric heating elements are configured to heat compressed air, a mixture of compressed air and fuel, combustion products of a mixture of compressed air and fuel, or a combination thereof, within the combustion chamber, to generate heated compressed air or heated combustion products, and wherein the combustion chamber housing is configured to generate an exhaust output based on the heated compressed air or the heated combustion products;

one or more gas turbine blades in a flow path of the exhaust output generated by the combustion chamber housing, wherein the gas turbine blades are configured to spin based on the exhaust output generated by the combustion chamber housing;

a gas turbine shaft connected to the one or more gas turbine blades, wherein the gas turbine shaft is configured to rotate based on the spinning of the one or more gas turbine blades, and wherein the gas turbine shaft is configured to generate mechanical power through rotation;

an electric generator connected to the gas turbine shaft, wherein the electric generator is configured to convert the mechanical power of rotation of the gas turbine shaft into electricity;

an electric generator controller coupled to the electric generator, wherein the electric generator is configured to direct the electricity generated by the electric generator to the electric generator controller through one or more connectors;

a heat recovery system coupled to the gas turbine engine, wherein the gas turbine engine is configured to direct the exhaust output generated by the combustion chamber housing to the heat recovery system through one or more connectors; and wherein the heat recovery system is configured to convert the heat of the exhaust output received from the gas turbine engine into steam;

a steam turbine engine coupled to the heat recovery system, wherein the heat recovery system is configured to direct the steam generated by the heat recovery system to the steam turbine engine through one or more connectors; and wherein the steam turbine engine comprises:

one or more steam turbine blades in a flow path of the steam generated by the heat recovery system, wherein the one or more steam turbine blades are configured to spin based on the steam generated by the heat recovery system; and a steam turbine shaft connected to the one or more steam turbine blades and to the electric generator, wherein the steam turbine shaft is configured to rotate based on the spinning of the one or more steam turbine blades, and wherein the steam turbine shaft is configured to generate mechanical power through rotation;

wherein the electric generator is configured to convert the mechanical power of rotation of the steam turbine shaft into electricity;

an electric motor coupled to the electric generator controller; wherein the electric generator controller is configured to direct the electricity received from the electric generator to the electric motor through one or more connectors, and wherein the electric motor is configured to convert the electricity received from the electric generator controller into torque;

a motor shaft connected to the electric motor, wherein the electric motor is configured to apply the torque generated by the electric motor to the motor shaft, and wherein the motor shaft is configured to rotate based on the torque applied to the motor shaft; and one or more propeller blades connected to the motor shaft, wherein the one or more propeller blades are configured to spin based on the rotation of the motor shaft, and wherein the one or more propeller blades are configured to generate propulsion through spinning.

6. The gas turbine engine system of claim 5, wherein the one or more electric heating elements comprise molybdenum disilicide, silicon carbide, or a combination thereof.

7. A gas turbine engine, comprising:

a combustion chamber housing comprising a housing wall defining a combustion chamber within the combustion chamber housing;

one or more electric heating elements within the combustion chamber, wherein the one or more electric heating elements are configured to heat compressed air, a mixture of compressed air and fuel, combustion products of a mixture of compressed air and fuel, or a combination thereof, within the combustion chamber, to generate heated compressed air or heated combustion products, and wherein the combustion chamber housing is configured to generate an exhaust output based on the heated compressed air or the heated combustion products;

one or more gas turbine blades in a flow path of the exhaust output generated by the combustion chamber housing, wherein the gas turbine blades are configured to spin based on the exhaust output generated by the combustion chamber housing;

a gas turbine shaft connected to the one or more gas turbine blades, wherein the gas turbine shaft is configured to rotate based on the spinning of the one or more gas turbine blades, and wherein the gas turbine shaft is configured to generate mechanical power through rotation;

an electric generator connected to the gas turbine shaft, wherein the electric generator is configured to convert the mechanical power of rotation of the gas turbine shaft, into electricity;

an electric generator controller coupled to the electric generator, wherein the electric generator is configured to direct the electricity generated by the electric generator to the electric generator controller through one or more connectors;

a heat recovery system coupled to the gas turbine engine, wherein the gas turbine engine is configured to direct the exhaust output generated by the combustion chamber housing to the heat recovery system through one or more connectors; and wherein the heat recovery system is configured to convert the heat of the exhaust output received from the gas turbine engine into steam;

a steam turbine engine coupled to the heat recovery system, wherein the heat recovery system is configured to direct the steam generated by the heat recovery system to the steam turbine engine through one or more connectors; and wherein the steam turbine engine comprises:

one or more steam turbine blades in a flow path of the steam generated by the heat recovery system, wherein the one or more steam turbine blades are configured to spin based on the steam generated by the heat recovery system; and a steam turbine shaft connected to the one or more steam turbine blades and to the electric generator, wherein the steam turbine shaft is configured to rotate based on the spinning of the one or more steam turbine blades, and wherein the steam turbine shaft is configured to generate mechanical power through rotation;

wherein the electric generator is configured to convert the mechanical power of rotation of the steam turbine shaft into electricity;

a pod coupled to the electric generator controller, wherein the electric generator controller is configured to direct the electricity received from the electric generator to the pod through one or more connectors;

an electric motor within the pod, wherein the pod is configured to direct the electricity received from the electric generator controller to the electric motor, and wherein the electric motor is configured to convert the electricity received from the pod into torque;

a propeller shaft within the pod and connected to the electric motor, wherein the electric motor is configured to apply the torque generated by the electric motor to the propeller shaft, and wherein the propeller shaft is configured to rotate based on the torque applied to the propeller shaft; and one or more propeller blades within the pod and connected to the propeller shaft, wherein the one or more propeller blades are configured to spin based on the rotation of the propeller shaft, and wherein the one or more propeller blades are configured to generate propulsion through spinning.

8. The gas turbine engine system of claim 7, wherein the one or more electric heating elements comprise molybdenum disilicide, silicon carbide, or a combination thereof.

9. A gas turbine engine, comprising:
a combustion chamber housing comprising a housing wall defining a combustion chamber within the combustion chamber housing;
one or more electric heating elements within the combustion chamber, wherein the one or more electric heating elements are configured to heat compressed air, a mixture of compressed air and fuel, combustion products of a mixture of compressed air and fuel, or a combination thereof, within the combustion chamber, to generate heated compressed air or heated combustion products, and wherein the combustion chamber housing is configured to generate an exhaust output based on the heated compressed air or the heated combustion products;
one or more gas turbine blades in a flow path of the exhaust output generated by the combustion chamber housing, wherein the gas turbine blades are configured to spin based on the exhaust output generated by the combustion chamber housing;
a gas turbine shaft connected to the one or more gas turbine blades, wherein the gas turbine shaft is configured to rotate based on the spinning of the one or more gas turbine blades, and wherein the gas turbine shaft is configured to generate mechanical power through rotation;
an electric generator connected to the gas turbine shaft, wherein the electric generator is configured to convert the mechanical power of rotation of the gas turbine shaft, into electricity;
an electric generator controller coupled to the electric generator, wherein the electric generator is configured to direct the electricity generated by the electric generator to the electric generator controller through one or more connectors;
a heat recovery system coupled to the gas turbine engine, wherein the gas turbine engine is configured to direct the exhaust output generated by the combustion chamber housing to the heat recovery system through one or more connectors; and wherein the heat recovery system is configured to convert the heat of the exhaust output generated by the combustion chamber housing into steam;
a steam turbine engine coupled to the heat recovery system, wherein the heat recovery system is configured to direct the steam generated by the heat recovery system to the steam turbine engine through one or more connectors, and wherein the steam turbine engine comprises:
one or more steam turbine blades in a flow path of the steam generated by the heat recovery system, wherein the one or more steam turbine blades are configured to spin based on the steam generated by the heat recovery system; and
a steam turbine shaft connected to the one or more steam turbine blades, wherein the steam turbine shaft is configured to rotate based on the spinning of the one or more steam turbine blades; and wherein the steam turbine shaft is configured to generate mechanical power through rotation;
a second electric generator connected to the steam turbine shaft, wherein the second electric generator is configured to convert the mechanical power of rotation of the steam turbine shaft into electricity; and
a second electric generator controller coupled to the second electric generator, wherein the second electric generator is configured to direct the electricity generated by the second electric generator to the second electric generator controller through one or more connectors.

10. The gas turbine engine system of claim 9, wherein the one or more electric heating elements comprise molybdenum disilicide, silicon carbide, or a combination thereof.

11. A gas turbine engine, comprising:
a combustion chamber housing comprising a housing wall defining a combustion chamber within the combustion chamber housing;
one or more electric heating elements within the combustion chamber, wherein the one or more electric heating elements are configured to heat compressed air, a mixture of compressed air and fuel, combustion products of a mixture of compressed air and fuel, or a combination thereof, within the combustion chamber, to generate heated compressed air or heated combustion products, and wherein the combustion chamber housing is configured to generate an exhaust output based on the heated compressed air or the heated combustion products;
one or more gas turbine blades in a flow path of the exhaust output generated by the combustion chamber housing, wherein the gas turbine blades are configured to spin based on the exhaust output generated by the combustion chamber housing;
a gas turbine shaft connected to the one or more gas turbine blades, wherein the gas turbine shaft is configured to rotate based on the spinning of the one or more gas turbine blades, and wherein the gas turbine shaft is configured to generate mechanical power through rotation;
an electric generator connected to the gas turbine shaft, wherein the electric generator is configured to convert the mechanical power of rotation of the gas turbine shaft into electricity;
an electric generator controller coupled to the electric generator, wherein the electric generator is configured to direct the electricity generated by the electric generator to the electric generator controller through one or more connectors;
a heat recovery system coupled to the gas turbine engine, wherein the gas turbine engine is configured to direct the exhaust output generated by the combustion chamber housing to the heat recovery system through one or more connectors; and wherein the heat recovery system is configured to convert the heat of the exhaust output generated by the combustion chamber housing into steam;
a steam turbine engine coupled to the heat recovery system, wherein the heat recovery system is configured to direct the steam generated by the heat recovery system to the steam turbine engine through one or more connectors, and wherein the steam turbine engine comprises:
one or more steam turbine blades in a flow path of the steam generated by the heat recovery system, wherein the one or more steam turbine blades are configured to spin based on the steam generated by the heat recovery system; and
a steam turbine shaft connected to the one or more steam turbine blades, wherein the steam turbine shaft is configured to rotate based on the spinning of the one or more steam turbine blades; and wherein the steam turbine shaft is configured to generate mechanical power through rotation;

a second electric generator connected to the steam turbine shaft, wherein the second electric generator is configured to convert the mechanical power of rotation of the steam turbine shaft into electricity;

a second electric generator controller coupled to the second electric generator, wherein the second electric generator is configured to direct the electricity generated by the second electric generator to the second electric generator controller through one or more connectors;

a first electric motor coupled to the electric generator controller; wherein the electric generator controller is configured to direct the electricity received from the electric generator to the first electric motor through one or more connectors, wherein the first electric motor is configured to convert the electricity received from the electric generator controller into torque;

a first motor shaft connected to the first electric motor, wherein the first electric motor is configured to apply the torque generated by the first electric motor to the first motor shaft, wherein the first motor shaft is configured to rotate based on the application of the torque applied to the first motor shaft;

one or more first propeller blades connected to the first motor shaft, wherein the one or more first propeller blades are configured to rotate with the first motor shaft, and wherein the one or more first propeller blades are configured to generate propulsion through rotation;

a second electric motor coupled to the second electric generator controller, wherein the second electric generator controller is configured to direct electricity received from the second electric generator to the second electric motor through one or more connectors; wherein the second electric motor is configured to convert the electricity received from the second electric generator controller into torque;

a second motor shaft connected to the second electric motor, wherein the second electric motor is configured to apply the torque generated by the second electric motor to the second motor shaft, and wherein the second motor shaft is configured to rotate based on the torque applied to the second motor shaft; and one or more second propeller blades connected to the second motor shaft, wherein the one or more second propeller blades are configured to rotate with the second motor shaft, and wherein the one or more second propeller blades are configured to generate propulsion through rotation.

12. The gas turbine engine system of claim 11, wherein the one or more electric heating elements comprise molybdenum disilicide, silicon carbide, or a combination thereof.

13. A gas turbine engine, comprising:

a combustion chamber housing comprising a housing wall defining a combustion chamber within the combustion chamber housing;

one or more electric heating elements within the combustion chamber, wherein the one or more electric heating elements are configured to heat compressed air, a mixture of compressed air and fuel, combustion products of a mixture of compressed air and fuel, or a combination thereof, within the combustion chamber, to generate heated compressed air or heated combustion products, and wherein the combustion chamber housing is configured to generate an exhaust output based on the heated compressed air or the heated combustion products;

one or more gas turbine blades in a flow path of the exhaust output generated by the combustion chamber housing, wherein the gas turbine blades are configured to spin based on the exhaust output generated by the combustion chamber housing; and a gas turbine shaft connected to the one or more gas turbine blades, wherein the gas turbine shaft is configured to rotate based on the spinning of the one or more gas turbine blades, and wherein the gas turbine shaft is configured to generate mechanical power through rotation;

an electric generator connected to the gas turbine shaft, wherein the electric generator is configured to convert the mechanical power of rotation of the gas turbine shaft into electricity;

an electric generator controller coupled to the electric generator, wherein the electric generator is configured to direct the electricity generated by the electric generator to the electric generator controller through one or more connectors;

a heat recovery system coupled to the gas turbine engine, wherein the gas turbine engine is configured to direct the exhaust output generated by the combustion chamber housing to the heat recovery system through one or more connectors; and wherein the heat recovery system is configured to convert the heat of the exhaust output generated by the combustion chamber housing into steam;

a steam turbine engine coupled to the heat recovery system, wherein the heat recovery system is configured to direct the steam generated by the heat recovery system to the steam turbine engine through one or more connectors, and wherein the steam turbine engine comprises:

one or more steam turbine blades in a flow path of the steam generated by the heat recovery system, wherein the one or more steam turbine blades are configured to spin based on the steam generated by the heat recovery system; and a steam turbine shaft connected to the one or more steam turbine blades, wherein the steam turbine shaft, is configured to rotate based on the spinning of the one or more steam turbine blades; and wherein the steam turbine shaft is configured to generate mechanical power through rotation;

a second electric generator connected to the steam turbine shaft, wherein the second electric generator is configured to convert the mechanical power of rotation of the steam turbine shaft into electricity;

a second electric generator controller coupled to the second electric generator, wherein the second electric generator is configured to direct the electricity generated by the second electric generator to the second electric generator controller through one or more connectors;

a first pod coupled to the electric generator controller, wherein the electric generator controller is configured to direct the electricity received from the electric generator to the first pod through one or more connectors;

a first electric motor within the first pod, wherein the first pod is configured to direct the electricity received from the electric generator controller to the first electric motor, and wherein the first electric motor is configured to convert the electricity received from the first pod into torque;

a first propeller shaft within the first pod and connected to the first electric motor, wherein the first electric motor is configured to apply the torque generated by the first electric motor to the first propeller shaft, and wherein the first propeller shaft is configured to rotate based on the torque applied to the first propeller shaft;

one or more first propeller blades within the first pod and connected to the first propeller shaft, wherein the one or more first propeller blades are configured to spin based on the rotation of the first propeller shaft, and wherein the one or more first propeller blades are configured to generate propulsion through spinning;

a second pod coupled to the second electric generator controller, wherein the second electric generator controller is configured to direct the electricity received from the second electric generator to the second pod through one or more connectors;

a second electric motor within the second pod, wherein the second pod is configured to direct the electricity received from the second electric generator controller to the second electric motor, and wherein the second electric motor is configured to convert the electricity received from the second pod into torque;

a second propeller shaft within the second pod and connected to the second electric motor, wherein the second electric motor is configured to apply the torque generated by the second electric motor to the second propeller shaft, and wherein the second propeller shaft is configured to rotate based on the application of the torque applied to the second propeller shaft; and one or more second propeller blades within the second pod and connected to the second propeller shaft, wherein the one or more second propeller blades are configured to spin based on the rotation of second propeller shaft, and wherein the one or more second propeller blades are configured to generate propulsion through spinning.

14. The gas turbine engine system of claim 13, wherein the one or more electric heating elements comprise molybdenum disilicide, silicon carbide, or a combination thereof.

* * * * *